US010797511B2

(12) United States Patent
Wenzel et al.

(10) Patent No.: US 10,797,511 B2
(45) Date of Patent: Oct. 6, 2020

(54) PHOTOVOLTAIC ENERGY SYSTEM WITH STATIONARY ENERGY STORAGE CONTROL AND POWER FACTOR CORRECTION

(71) Applicant: Johnson Controls Technology Company, Auburn Hills, MI (US)

(72) Inventors: Michael J. Wenzel, Oak Creek, WI (US); Kirk H. Drees, Cedarburg, WI (US); Camille M. Aucoin, Milwaukee, WI (US)

(73) Assignee: Johnson Controls Technology Company, Auburn Hills, MI (US)

( * ) Notice: Subject to any disclaimer, the term of this patent is extended or adjusted under 35 U.S.C. 154(b) by 189 days.

(21) Appl. No.: 16/147,356

(22) Filed: Sep. 28, 2018

(65) Prior Publication Data

US 2020/0106294 A1 Apr. 2, 2020

(51) Int. Cl.
*H02J 7/35* (2006.01)
*H02S 40/32* (2014.01)
(Continued)

(52) U.S. Cl.
CPC .............. *H02J 7/35* (2013.01); *G05B 13/048* (2013.01); *G06Q 30/0283* (2013.01);
(Continued)

(58) Field of Classification Search
CPC ........ H02J 7/35; H02S 40/32; G06Q 30/0283; G06Q 50/06
See application file for complete search history.

(56) References Cited

U.S. PATENT DOCUMENTS

| 5,225,712 A * | 7/1993 | Erdman | ................... F03D 7/042 |
| | | | 290/44 |
| 9,014,868 B2 * | 4/2015 | Hazra | ....................... H02J 3/18 |
| | | | 700/287 |

(Continued)

OTHER PUBLICATIONS

U.S. Appl. No. 15/473,496, filed Mar. 29, 2017, Johnson Controls Technology Company.

(Continued)

*Primary Examiner* — Mark A Connolly
(74) *Attorney, Agent, or Firm* — Foley & Lardner LLP

(57) ABSTRACT

An energy storage system includes a photovoltaic energy field, a stationary energy storage device, an energy converter, and a controller. The photovoltaic energy field converts solar energy into electrical energy and charges the stationary energy storage device with the electrical energy. The energy converter converts the electrical energy stored in the stationary energy storage device into AC power at a discharge rate and supplies a campus with the AC power at the discharge rate. The controller predicts a required load of the campus and an electrical generation of the photovoltaic energy field across a time horizon and optimizes a cost function subject to a set of constraints to determine a discharge rate of the AC power to achieve a desired power factor. At least one of the set of constraints applied to the cost function ensures that the energy converter can convert the electrical energy stored in the stationary energy storage device into AC power having the determined power factor and discharge rate.

20 Claims, 10 Drawing Sheets

(51) Int. Cl.
*G06Q 30/02* (2012.01)
*G06Q 50/06* (2012.01)
*H02J 3/16* (2006.01)
*H02S 40/38* (2014.01)
*H02J 3/38* (2006.01)
*G05B 13/04* (2006.01)
*H02J 3/00* (2006.01)

(52) U.S. Cl.
CPC ............... *G06Q 50/06* (2013.01); *H02J 3/16* (2013.01); *H02J 3/383* (2013.01); *H02S 40/32* (2014.12); *H02S 40/38* (2014.12); *H02J 3/003* (2020.01); *H02J 2203/20* (2020.01)

(56) References Cited

U.S. PATENT DOCUMENTS

| | | | |
|---|---|---|---|
| 2014/0319916 A1* | 10/2014 | Cummings | H02S 40/32 307/53 |
| 2015/0316901 A1 | 11/2015 | Wenzel et al. | |
| 2015/0316902 A1 | 11/2015 | Wenzel et al. | |
| 2015/0316907 A1 | 11/2015 | Elbsat et al. | |
| 2016/0377306 A1 | 12/2016 | Drees et al. | |
| 2017/0102162 A1 | 4/2017 | Drees et al. | |
| 2017/0103483 A1 | 4/2017 | Drees et al. | |
| 2017/0104336 A1 | 4/2017 | Elbsat et al. | |
| 2017/0104337 A1 | 4/2017 | Drees | |
| 2017/0104342 A1 | 4/2017 | Elbsat et al. | |
| 2017/0104343 A1 | 4/2017 | Elbsat et al. | |
| 2017/0104344 A1 | 4/2017 | Wenzel et al. | |
| 2017/0104345 A1 | 4/2017 | Wenzel et al. | |
| 2017/0104346 A1 | 4/2017 | Wenzel et al. | |
| 2017/0104449 A1 | 4/2017 | Drees | |
| 2017/0187185 A1* | 6/2017 | Kim | H02M 1/4208 |
| 2018/0031641 A1 | 2/2018 | Drees | |
| 2018/0034285 A1 | 2/2018 | Baumgartner et al. | |
| 2018/0034286 A1 | 2/2018 | Dorneanu et al. | |
| 2018/0054061 A1 | 2/2018 | Dorneanu et al. | |
| 2018/0254498 A1* | 9/2018 | Patel | H01M 16/006 |
| 2018/0254632 A1 | 9/2018 | Elbsat et al. | |

OTHER PUBLICATIONS

U.S. Appl. No. 15/953,313, filed Apr. 13, 2018, Johnson Controls Technology Company.

* cited by examiner

PHOTOVOLTAIC ENERGY SYSTEM WITH STATIONARY ENERGY STORAGE CONTROL AND POWER FACTOR CORRECTION

BACKGROUND

The present disclosure relates generally to a photovoltaic energy system and more particularly to systems and methods for controlling a stationary energy storage in a photovoltaic energy system.

Photovoltaic energy systems are used to convert solar energy into electricity using solar panels or other materials that exhibit the photovoltaic effect. Large scale photovoltaic energy systems include a collection of solar panels that form a photovoltaic field. The power output of a photovoltaic energy system is largely dependent upon weather conditions and other environmental factors that affect solar intensity. Changes in solar intensity can occur suddenly, for example, if a cloud formation casts a shadow upon the photovoltaic field.

The electricity generated by the photovoltaic energy system may be stored in a stationary storage device such as a battery. The battery may be charged and discharged throughout the day to power a building. Optimal control of the charge and discharge of the battery may reduce the amount of energy purchased from an energy grid and may have economic advantages.

SUMMARY

One implementation of the present disclosure is a energy storage system including a photovoltaic energy field configured to convert solar energy into electrical energy, a stationary energy storage device, an energy converter, a point of interconnection, and a controller. The energy converter is configured to convert the electrical energy from the photovoltaic energy field and store the converted energy in the stationary energy storage device at a charge rate, convert the electrical energy stored in the stationary energy storage device into AC power and discharge the AC power a discharge rate, and supply a campus with the AC power at the discharge rate. The point of interconnection is configured to receive power from an energy grid, the energy converter, and the photovoltaic energy field and configured to supply power to the campus. The controller is configured to predict a load of the campus over a time horizon, predict an energy generation of the photovoltaic energy field over the time horizon, generate a cost function defining a cost of supplying the power to the campus over the time horizon, identify a current reactive power of the campus, determine a required amount of reactive power from the energy converter to at least partially negate the current reactive power to achieve a target power factor, and apply a set of constraints to the cost function. The constraints define a relationship between the discharge rate of the AC power and one or more variables in the cost function and ensure that the energy converter has sufficient capacity to supply both the AC power at the discharge rate and the required amount of reactive power. The controller is configured to determine a solution to the cost function which satisfies the set of constraints, wherein the solution comprises a minimization of the cost function over the time horizon, a specific discharge rate of the AC power, and at least one of the required amount of reactive power or the target power factor to achieve the solution. The controller is configured to control the energy converter to supply the campus with the AC power at the specific discharge rate and the required amount of reactive power to achieve the target power factor.

In some embodiments, the cost function includes an energy charge defining a cost per unit of energy received from the energy grid and a demand charge defining a cost based on a maximum rate of energy usage over a demand charge horizon.

In some embodiments, the cost function includes a weighting term that normalizes the demand charge horizon to the time horizon.

In some embodiments, the set of constraints includes at least one of an energy balance constraint ensuring that the solution satisfies an energy balance of the energy storage system at the point of interconnection, a set of stationary storage system constraints ensuring that the solution satisfies an energy capacity of the stationary energy storage device and that the solution does not require the stationary energy storage device to provide AC power to the campus at a discharge rate greater than a threshold value, a minimum import constraint ensuring that power is not returned to the energy grid, a maximum import constraint ensuring that the power drawn from the energy grid does not exceed a demand value, or a power factor constraint. The power factor constraint may ensure at least one of: the solution results in a power factor of the campus meeting a power factor target at all time intervals in the time horizon or the solution results in an average power factor of the campus meeting an average power factor target over a period of time.

In some embodiments, the system includes a campus predictor configured to predict an energy load of the campus and a photovoltaic predictor configured to predict a rate of energy production by the photovoltaic energy field.

In some embodiments, the campus predictor is configured to predict the energy load of the campus based on historical load data of the campus and weather data. In some embodiments, the photovoltaic predictor is configured to predict the rate of energy production by the photovoltaic energy field based on historical energy production data of the photovoltaic energy field and weather data.

In some embodiments, determining the required amount of reactive power includes measuring a real power of the photovoltaic field, a real power of the campus, a reactive power of the campus, and a real power of the energy converter and calculating the required amount of reactive power based on at least one of the real power of the photovoltaic field, the real power of the campus, the reactive power of the campus, and the real power of the energy converter.

Another implementation of the present disclosure is a method for decreasing a cost associated with powering a campus. The method includes converting solar energy into electrical energy and storing the electrical energy in a stationary energy storage device at a charge rate, converting the electrical energy stored in the stationary energy storage device into AC power at a discharge rate and supplying the AC power at the discharge rate to the campus, generating a cost function defining a cost of supplying the power to the campus over the time horizon, identifying a current reactive power of the campus, determining a required amount of reactive power from the energy converter to at least partially negate the current reactive power to achieve a target power factor, and applying a set of constraints to the cost function. The constraints define a relationship between the discharge rate of the AC power and one or more variables in the cost function and ensuring that the energy converter has sufficient capacity to supply both the AC power at the discharge rate and the required amount of reactive power. The method includes determining a solution to the cost function which satisfies the set of constraints, wherein the solution comprises a minimization of the cost function over the time horizon, a specific discharge rate of the AC power, and at least one of the required amount of reactive power or the target power factor to achieve the solution. The method includes controlling the energy converter to supply the campus with the AC power at the specific discharge rate and the required amount of reactive power to achieve the target power factor.

In some embodiments, the cost function includes an energy charge defining a cost per unit of energy received from the energy grid and a demand charge defining a cost based on a maximum rate of energy usage over a demand charge horizon.

In some embodiments, the cost function includes a weighting term that normalizes the demand charge horizon to the time horizon.

In some embodiments, the method includes applying an energy balance constraint to the cost function that ensures that the solution satisfies an energy balance of an energy storage system at a point of interconnection, applying a set of stationary storage system constraints to the cost function that ensures that the solution satisfies an energy capacity of the stationary energy storage device and that the solution does not require the stationary energy storage device to provide AC power to the campus at a discharge rate greater than a threshold value, applying a minimum import constraint to the cost function that ensures that power is not returned to the energy grid, applying a maximum import constraint to the cost function that ensures that the power drawn from the energy grid does not exceed a demand value, or applying a power factor constraint. The power factor constraint ensures at least one of the solution results in a power factor of the campus meeting a power factor target at all time intervals in the time horizon or the solution results in an average power factor of the campus meeting an average power factor target over a period of time.

Another implementation of the present disclosure is a controller for an energy storage system having a photovoltaic energy field, a battery, and a battery inverter configured to charge the battery with electrical energy from the photovoltaic energy field, convert stored electrical energy from the battery into AC power, and discharge the AC power at a discharge rate to supply power to a campus. The controller is configured to predict a load of the campus over a time horizon, predict an energy generation of the photovoltaic energy field over the time horizon, generate a cost function defining a cost of supplying the power to the campus over the time horizon, identify a current reactive power of the campus, determine a required amount of reactive power from the battery inverter to at least partially negate the current reactive power to achieve a target power factor, and apply a set of constraints to the cost function. The constraints define a relationship between the discharge rate of the AC power and one or more variables in the cost function and ensuring that the battery inverter has sufficient capacity to supply both the AC power at the discharge rate and the required amount of reactive power. The controller is configured to determine a solution to the cost function which satisfies the set of constraints, wherein the solution comprises a minimization of the cost function over the time horizon, a specific discharge rate of the AC power, and at least one of the required amount of reactive power or the target power factor to achieve the solution. The controller is configured to control the battery inverter to supply the campus with the AC power at the specific discharge rate and the required amount of reactive power to achieve the target power factor.

In some embodiments, the cost function includes an energy charge defining a cost per unit of energy received from the energy grid and a demand charge defining a cost based on a maximum rate of energy usage over a demand charge horizon.

In some embodiments, the cost function includes a weighting term that normalizes the demand charge horizon to the time horizon.

In some embodiments, the set of constraints include at least one of an energy balance constraint ensuring that the solution satisfies an energy balance of the energy storage system at the point of interconnection, a set of battery capacity constraints ensuring that the solution satisfies an energy capacity of the battery and that the solution does not require the battery to provide AC power to the campus at a discharge rate greater than a threshold value, a minimum import constraint ensuring that power is not returned to the energy grid, a maximum import constraint ensuring that the power drawn from the energy grid does not exceed a demand value, or a power factor constraint. The power factor constraint may ensure at least one of: the solution results in a power factor of the campus meeting a power factor target at all time intervals in the time horizon, or the solution results in an average power factor of the campus meeting an average power factor target over a period of time.

In some embodiments, the controller includes a campus predictor configured to predict an energy load of the campus over the time horizon and a photovoltaic predictor module configured to predict a rate of energy production by the photovoltaic energy field over the time horizon.

In some embodiments, the campus load predictor is configured to calculate an uncertainty of the predicted energy load of the campus over the time horizon and the photovoltaic predictor is further configured to calculate an uncertainty of the predicted rate of photovoltaic energy production over the time horizon.

In some embodiments, the controller includes a low level controller configured to determine control signals to adjust an operation of the battery inverter to achieve the specific discharge rate and power factor of the battery inverter.

In some embodiments, the cost function includes a power factor term defining a power factor violation term and a penalty cost associated with the power factor violation term.

In some embodiments, the controller is configured to increase or decrease the power factor violation term based on at least one of a difference of the power factor of the campus and the power factor target and a difference of the average power factor of the campus and the target average power factor over a period of time.

DETAILED DESCRIPTION

Referring generally to the FIGURES, systems and methods for controlling a stationary storage device (e.g., a battery), in a photovoltaic energy system are shown, according to various exemplary embodiments. A photovoltaic energy system includes a photovoltaic field configured to convert solar energy into electrical energy. The photovoltaic field generates a direct current (DC) output, which is converted to an alternating current (AC) output by a power inverter. In some embodiments, the AC output is provided to a campus and/or stored in a stationary storage device and represents the electric power output of the photovoltaic energy system. The electric power output of the photovoltaic energy system may vary based on the solar intensity within the photovoltaic field. A change in solar intensity may be caused, for example, by a cloud casting a shadow on the photovoltaic field.

The photovoltaic energy system may include a PV field power inverter, a stationary storage device, and an energy converter according to some embodiments. Additionally, the photovoltaic energy system may also include a controller configured to control an operation of the energy converter and/or the PV field power inverter according to some embodiments. The stationary storage device may be configured to store energy generated by the PV field, according to some embodiments. The PV field power inverter and the energy converter may be configured to supply a campus with power according to some embodiments. In some embodiments, the campus may also be configured to purchase any other required power from an energy grid. The controller may implement a variety of algorithms to minimize costs associated with purchasing power/energy from the energy grid, according to some embodiments. In some embodiments, the controller may predict required loads of the campus, energy generation of the PV field, and may determine a cost function. The controller may be configured to determine optimal control of the PV field power inverter and the energy converter by minimizing the cost function, subject to a variety of constraints. This may result in economic savings by decreasing the amount of energy/power purchased to power the campus. The constraints applied to the cost function may include a non-export constraint (i.e., not allowing energy to return to the energy grid), in some embodiments. In some embodiments, the constraints applied may ensure that optimal control of the PV field power inverter and/or the energy converter, determined through minimizing the cost function, result in a desirable power factor. Additional features and advantages of the present invention are described in greater detail below.

Photovoltaic Energy System

Figure 1:
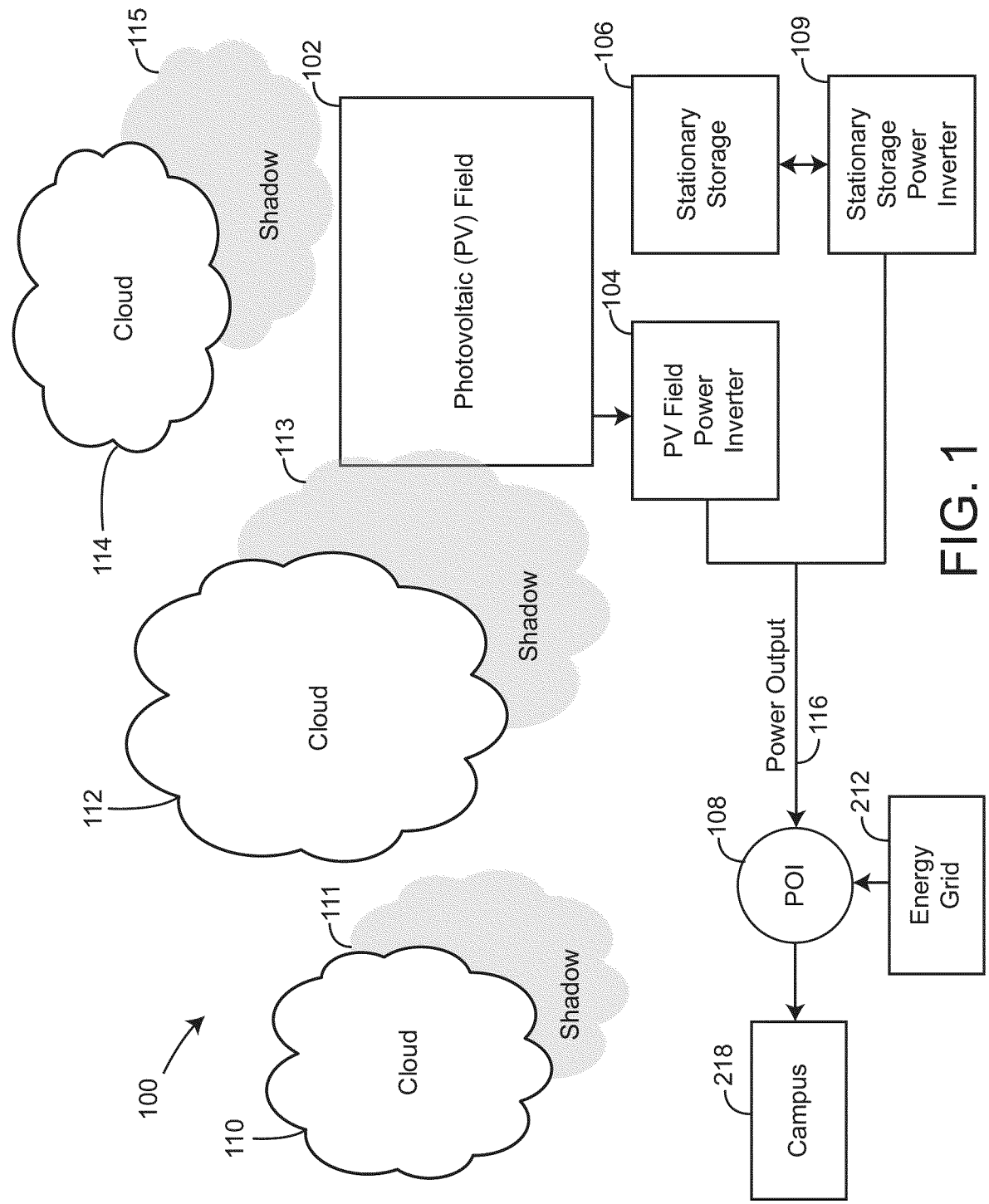
FIG. 1 is a block diagram of a conventional photovoltaic system, according to some embodiments.

Referring now to FIG. 1, a photovoltaic energy system 100 is shown, according to an exemplary embodiment. System 100 may be configured to convert solar energy into electricity using solar panels or other materials that exhibit the photovoltaic effect. System 100 stores collected solar energy in a stationary storage device (e.g., a battery, a hydrogen electrolysis device, etc.). The stored solar energy may be used by system 100 to satisfy a demand for electricity at times when electricity consumption exceeds photovoltaic energy production (e.g., at night).

System 100 is shown to include a photovoltaic (PV) field 102, a PV field power inverter 104, a stationary storage device 106, a stationary storage device inverter 109, a campus 218, an energy grid 212, and a point of interconnection 108. PV field 102 may include a collection of photovoltaic cells. The photovoltaic cells are configured to convert solar energy (i.e., sunlight) into electricity using a photovoltaic material such as monocrystalline silicon, polycrystalline silicon, amorphous silicon, cadmium telluride, copper indium gallium selenide/sulfide, or other materials that exhibit the photovoltaic effect. In some embodiments, the photovoltaic cells are contained within packaged assemblies that form solar panels. Each solar panel may include a plurality of linked photovoltaic cells. The solar panels may combine to form a photovoltaic array.

PV field 102 may have any of a variety of sizes and/or locations. In some embodiments, PV field 102 is part of a large-scale photovoltaic power station (e.g., a solar park or farm) capable of providing an energy supply to a large number of consumers. When implemented as part of a large-scale system, PV field 102 may cover multiple hectares and may have power outputs of tens or hundreds of megawatts. In other embodiments, PV field 102 may cover a smaller area and may have a relatively lesser power output (e.g., between one and ten megawatts, less than one megawatt, etc.). For example, PV field 102 may be part of a rooftop-mounted system capable of providing enough electricity to power a single home or building or campus. It is contemplated that PV field 102 may have any size, scale, and/or power output, as may be desirable in different implementations.

PV field 102 may generate a variable direct current (DC) output that depends on the intensity and/or directness of the sunlight to which the solar panels are exposed. The directness of the sunlight may depend on the angle of incidence of the sunlight relative to the surfaces of the solar panels. The intensity of the sunlight may be affected by a variety of factors such as clouds that cast a shadow upon PV field 102. For example, FIG. 1 is shown to include several clouds 110, 112, and 114 that cast shadows 111, 113, and 115, respectively. If any of the shadows falls upon PV field 102, the power output of PV field 102 may drop as a result of the decrease in solar intensity.

In some embodiments, PV field 102 is configured to maximize solar energy collection. For example, PV field 102 may include a solar tracker (e.g., a GPS tracker, a sunlight sensor, etc.) that adjusts the angle of the solar panels so that the solar panels are aimed directly at the sun throughout the day. The solar tracker may allow the solar panels to receive direct sunlight for a greater portion of the day and may increase the total amount of power produced by PV field 102. In some embodiments, PV field 102 includes a collection of mirrors, lenses, or solar concentrators configured to direct and/or concentrate sunlight on the solar panels. The energy generated by PV field 102 may be provided to point of interconnection 108 through PV field power inverter 104 and/or stored in stationary storage device 106 through stationary storage power inverter 109.

Still referring to FIG. 1, system 100 is shown to include a PV field power inverter 104. Power inverter 104 may be configured to convert the DC output of PV field 102 into an alternating current (AC) output that can be fed into point of interconnection 108. For example, power inverter 104 may be a solar inverter or grid-tie inverter configured to convert the DC output from PV field 102 into a sinusoidal AC output synchronized to the grid frequency of point of interconnection 108. In some embodiments, power inverter 104 receives a cumulative DC output from PV field 102. For example, power inverter 104 may be a string inverter or a central inverter. In other embodiments, power inverter 104 may include a collection of micro-inverters connected to each solar panel or solar cell.

Power inverter 104 may receive a DC power output from PV field 102 and convert the DC power output to an AC power output that can be fed into point of interconnection 108. In some embodiments, point of interconnection 108 may supply power to a campus or a stationary storage device (i.e., a battery). In some embodiments, power inverter 104 is a resonant inverter that includes or uses LC circuits to remove the harmonics from a simple square wave in order to achieve a sine wave matching the frequency of point of interconnection 108 or the frequency of the campus or any other desired frequency. In various embodiments, power inverter 104 may operate using high-frequency transformers, low-frequency transformers, or without transformers. Low-frequency transformers may convert the DC output from PV field 102 directly to the AC output provided to point of interconnection 108. High-frequency transformers may employ a multi-step process that involves converting the DC output to high-frequency AC, then back to DC, and then finally to the AC output provided to point of interconnection 108.

Power inverter 104 may be configured to perform maximum power point tracking and/or anti-islanding. Maximum power point tracking may allow power inverter 104 to produce the maximum possible AC power from PV field 102. For example, power inverter 104 may sample the DC power output from PV field 102 and apply a variable resistance to find the optimum maximum power point. Anti-islanding is a protection mechanism that immediately shuts down power inverter 104 (i.e., preventing power inverter 104 from generating AC power) when the connection to an electricity-consuming load no longer exists.

Still referring to FIG. 1, system 100 is shown to include a stationary storage power inverter 109. Stationary storage power inverter 109 may receive a DC power output from stationary storage device 106 and convert the DC power output into an AC power output that can be fed into point of interconnection 108. Stationary storage power inverter 109 may be the same or similar to PV field power inverter 104 with the exception that stationary storage power inverter 109 controls the power output of stationary storage device 106, whereas PV field power inverter 104 controls the power output of PV field 102. The power outputs from PV field power inverter 104 and stationary storage power inverter 109 combine to form the power output 116 provided to point of interconnection 108.

In some embodiments, system 100 does not include stationary storage device 106 and stationary storage power inverter 109. PV field 102 may output DC power directly into PV field power inverter 104 which may convert the DC power to AC power and supply the AC power to point of interconnection 108, according to some embodiments. In some embodiments, stationary storage power inverter 109 is connected to point of interconnection 108, receives AC power from point of interconnection 108, converts the AC power to DC power, and transfers the DC power to stationary storage device 106. Stationary storage device 106 may be connected to point of interconnection 108, connected directly to the campus 218, or connected to the campus 218 through point of interconnection 108.

System 100 may be configured to control a ramp rate of the power output 116 provided to point of interconnection 108. Ramp rate may be defined as the time rate of change of power output 116. Power output 116 may vary depending on the magnitude of the DC output provided by PV field 102. For example, if a cloud passes over PV field 102, power output 116 may rapidly and temporarily drop while PV field 102 is within the cloud's shadow. System 100 may be configured to calculate the ramp rate by sampling power output 116 and determining a change in power output 116 over time. For example, system 100 may calculate the ramp rate as the derivative or slope of power output 116 as a function of time, as shown in the following equations:

$$\text{Ramp Rate} = \frac{dP}{dt} \text{ or Ramp Rate} = \frac{\Delta P}{\Delta t}$$

where P represents power output 116 and t represents time.

System 100 may use stationary storage device 106 to perform ramp rate control. For example, system 100 may use energy from stationary storage device 106 to smooth a sudden drop in power output 116 so that the absolute value of the ramp rate is less than a threshold value. As previously mentioned, a sudden drop in power output 116 may occur when a solar intensity disturbance occurs, such as a passing cloud blocking the sunlight to PV field 102. System 100 may use the energy from stationary storage device 106 to make up the difference between the power provided by PV field 102 (which has suddenly dropped) and the minimum required power output 116 to maintain the required ramp rate. The energy from stationary storage device 106 allows system 100 to gradually decrease power output 116 so that the absolute value of the ramp rate does not exceed the threshold value.

Once the cloud has passed, the power output from PV field 102 may suddenly increase as the solar intensity returns to its previous value. System 100 may perform ramp rate control by gradually ramping up power output 116. Ramping up power output 116 may not require energy from stationary storage device 106. For example, power inverter 104 may use only a portion of the energy generated by PV field 102 (which has suddenly increased) to generate power output 116 (i.e., limiting the power output) so that the ramp rate of power output 116 does not exceed the threshold value. The remainder of the energy generated by PV field 102 (i.e., the excess energy) may be stored in stationary storage device 106 and/or dissipated. Limiting the energy generated by PV field 102 may include diverting or dissipating a portion of the energy generated by PV field 102 (e.g., using variable resistors or other circuit elements) so that only a portion of the energy generated by PV field 102 is provided to point of interconnection 108. This allows power inverter 104 to ramp up power output 116 gradually without exceeding the ramp rate. The excess energy may be stored in stationary storage device 106, used to power other components of system 100, or dissipated.

In system 100, limiting the energy generated by PV field 102 is only effective to control the ramp rate when the power output of PV field 102 is suddenly increasing. However, when the power output of PV field 102 suddenly decreases, system 100 requires energy from stationary storage device 106 to prevent the absolute value of the ramp rate from exceeding the threshold value. The capacity and charge/discharge rates of stationary storage device 106 required to perform ramp rate control can be substantial. In some instances, the storage capacity needed to satisfy the ramp rate requirements may be approximately 30% of the maximum power capacity of PV field 102.

System 100 may adjust the ramp rate using any of the techniques described in U.S. patent application Ser. No. 15/247,869, titled "Photovoltaic Energy System with Solar Intensity Prediction" and filed Aug. 25, 2016, the entirety of which is incorporated by reference herein.

Electrical Energy Storage System

Figure 2:
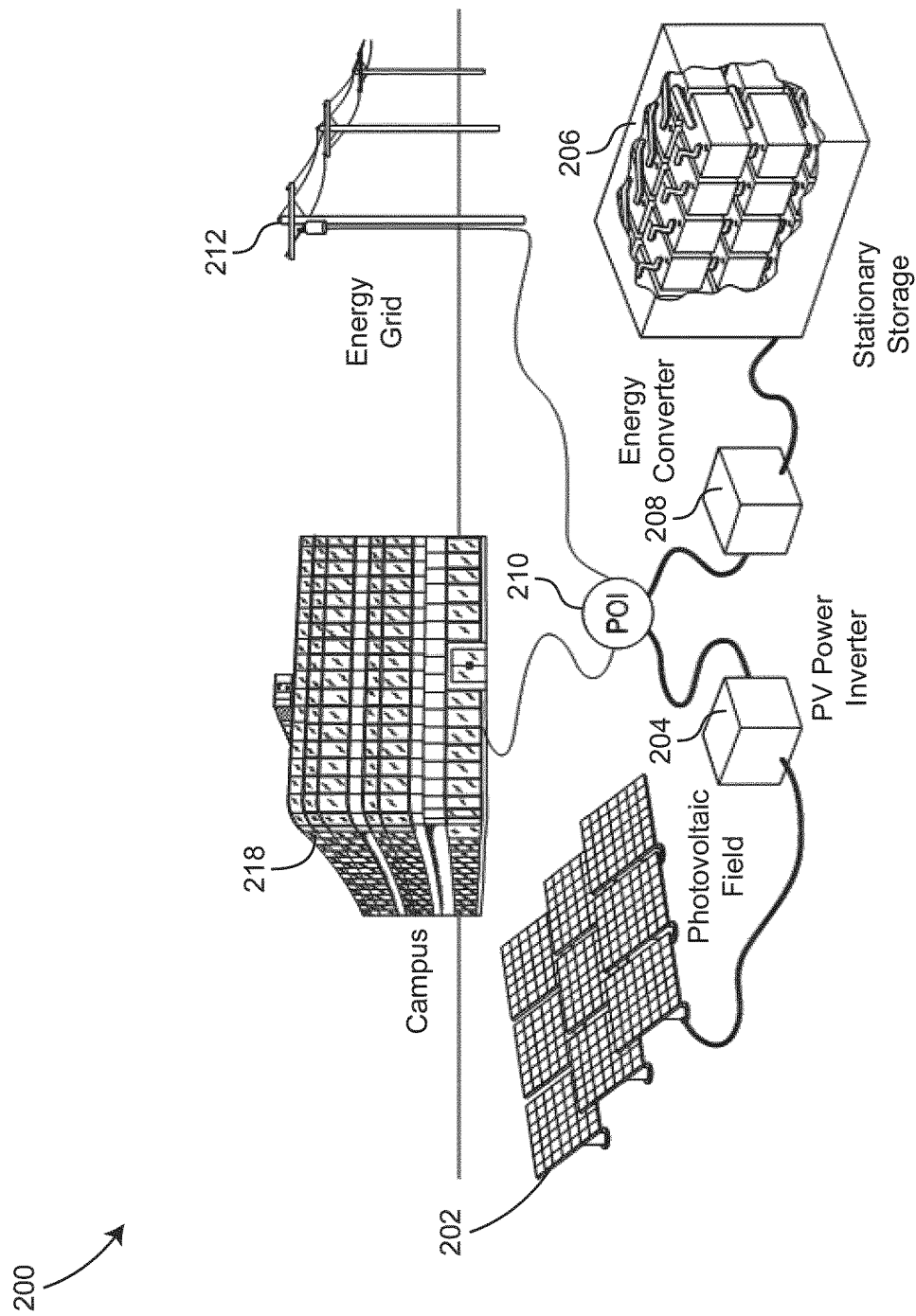
FIG. 2 is a drawing of an electrical energy storage system, shown to include an energy converter, according to some embodiments.
Figure 3:
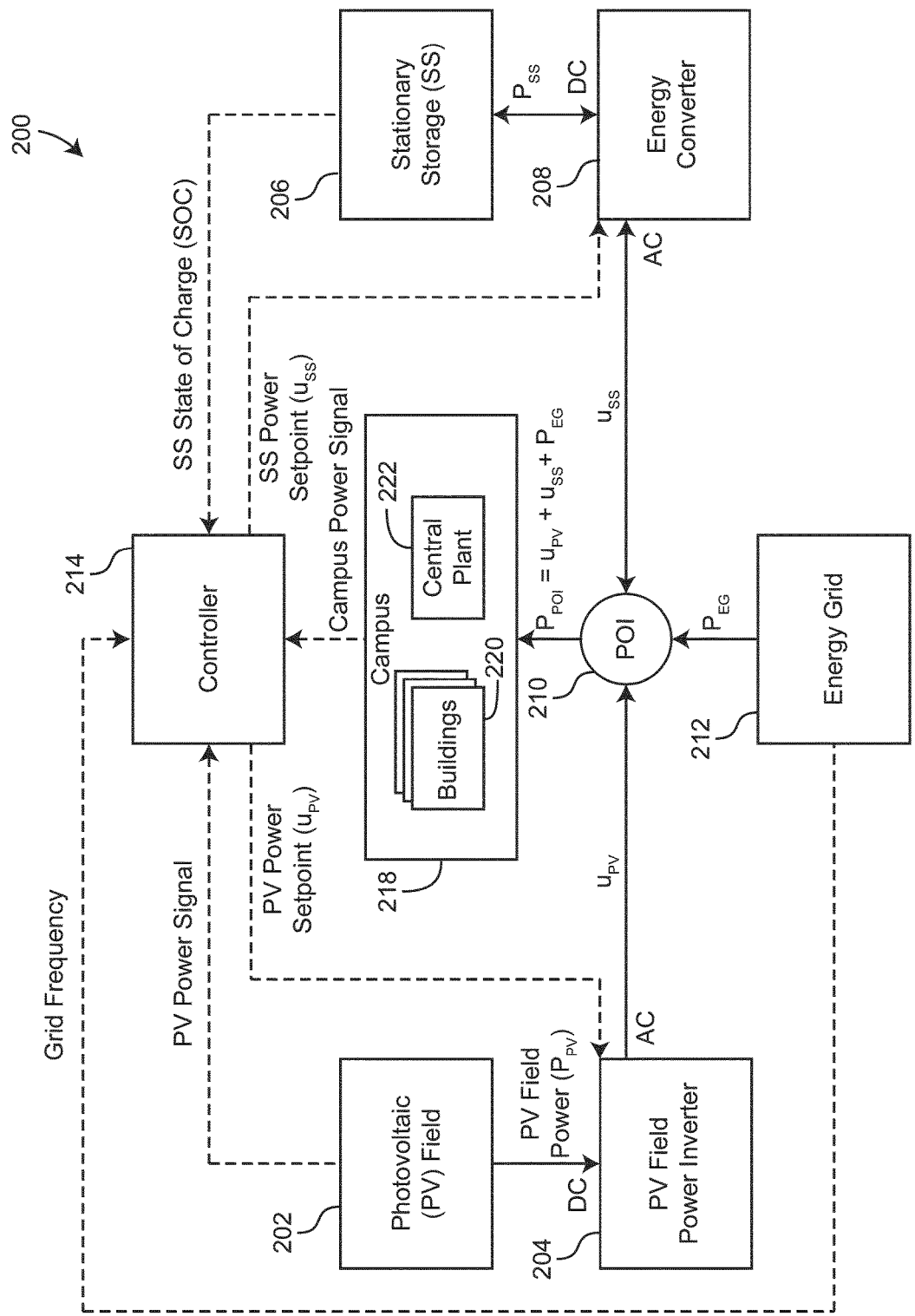
FIG. 3 is a block diagram of the electrical energy storage system of FIG. 2, shown to include a controller and an energy converter, according to some embodiments.

Referring now to FIGS. 2-3, an electrical energy storage system 200 is shown, according to an exemplary embodiment. System 200 is shown to include a photovoltaic (PV) field 202, a PV field power inverter 204, a stationary storage device 206, an energy converter 208, a point of interconnection (POI) 210, and an energy grid 212. In some embodiments, system 200 also includes a controller 214 (shown in FIG. 3) and/or a campus 218. In brief overview, PV field power inverter 204 can be operated by controller 214 to control the power output of PV field 202. Similarly, energy converter 208 can be operated by controller 214 to control the power input and/or power output of stationary storage 206. The power outputs of PV field power inverter 204, energy converter 208, and energy grid 212 combine at POI 210 to form the power provided to campus 218 according to some embodiments. In some embodiments, campus 218 is also connected to POI 210. Campus 218 can consume a portion of the combined power at POI 210 to satisfy the energy requirements of campus 218.

PV field 202 may include a collection of photovoltaic cells. The photovoltaic cells are configured to convert solar energy (i.e., sunlight) into electricity using a photovoltaic material such as monocrystalline silicon, polycrystalline silicon, amorphous silicon, cadmium telluride, copper indium gallium selenide/sulfide, or other materials that exhibit the photovoltaic effect. In some embodiments, the photovoltaic cells are contained within packaged assemblies that form solar panels. Each solar panel may include a plurality of linked photovoltaic cells. The solar panels may combine to form a photovoltaic array.

PV field 202 may have any of a variety of sizes and/or locations. In some embodiments, PV field 202 is part of a large-scale photovoltaic power station (e.g., a solar park or farm) capable of providing an energy supply to a large number of consumers. When implemented as part of a large-scale system, PV field 202 may cover multiple hectares and may have power outputs of tens or hundreds of megawatts. In other embodiments, PV field 202 may cover a smaller area and may have a relatively lesser power output (e.g., between one and ten megawatts, less than one megawatt, etc.). For example, PV field 202 may be part of a rooftop-mounted system capable of providing enough electricity to power a single home or building. It is contemplated that PV field 202 may have any size, scale, and/or power output, as may be desirable in different implementations.

PV field 202 may generate a direct current (DC) output that depends on the intensity and/or directness of the sunlight to which the solar panels are exposed. The directness of the sunlight may depend on the angle of incidence of the sunlight relative to the surfaces of the solar panels. The intensity of the sunlight may be affected by a variety of environmental factors such as the time of day (e.g., sunrises and sunsets) and weather variables such as clouds that cast shadows upon PV field 202. When PV field 202 is partially or completely covered by shadow, the power output of PV field 202 (i.e., PV field power $P_{PV}$) may drop as a result of the decrease in solar intensity.

In some embodiments, PV field 202 is configured to maximize solar energy collection. For example, PV field 202 may include a solar tracker (e.g., a GPS tracker, a sunlight sensor, etc.) that adjusts the angle of the solar panels so that the solar panels are aimed directly at the sun throughout the day. The solar tracker may allow the solar panels to receive direct sunlight for a greater portion of the day and may increase the total amount of power produced by PV field 202. In some embodiments, PV field 202 includes a collection of mirrors, lenses, or solar concentrators configured to direct and/or concentrate sunlight on the solar panels. The energy generated by PV field 202 may be stored in stationary storage device 206 and/or provided to campus 218 according to some embodiments.

Still referring to FIG. 2-3, system 200 is shown to include a PV field power inverter 204. Power inverter 204 may be configured to convert the DC output of PV field 202 $P_{PV}$ into an alternating current (AC) output that can be fed into stationary storage device 206 and/or campus 218. For example, power inverter 204 may be a solar inverter or grid-tie inverter configured to convert the DC output from PV field 202 into a sinusoidal AC output at a frequency determined by controller 214. In some embodiments, power inverter 204 receives a cumulative DC output from PV field 202. For example, power inverter 204 may be a string inverter or a central inverter. In other embodiments, power inverter 204 may include a collection of micro-inverters connected to each solar panel or solar cell. PV field power inverter 204 may convert the DC power output $P_{PV}$ into an AC power output $u_{PV}$ and provide the AC power output $u_{PV}$ to POI 210. As used herein, the variable $u_{PV}$ denotes both the PV power setpoint provided by controller 214 and the actual amount of power transferred from PV field power inverter 204 to POI 210 as both are expected to have the same value.

Power inverter 204 may receive the DC power output $P_{PV}$ from PV field 202 and convert the DC power output to an AC power output that can be fed into campus 218. Power inverter 204 may synchronize the frequency of the AC power output with that of energy grid 212 (e.g., 50 Hz or 60 Hz) using a local oscillator and may limit the voltage of the AC power output to no higher than the grid voltage. In some embodiments, power inverter 204 may output the AC power at a frequency determined by controller 214. In some embodiments, power inverter 204 is a resonant inverter that includes or uses LC circuits to remove the harmonics from a simple square wave in order to achieve a sine wave matching the frequency of energy grid 212 or matching the desired frequency determined by controller 214. In various embodiments, power inverter 204 may operate using high-frequency transformers, low-frequency transformers, or without transformers. Low-frequency transformers may convert the DC output from PV field 202 directly to the AC output provided to campus 218. High-frequency transformers may employ a multi-step process that involves converting the DC output to high-frequency AC, then back to DC, and then finally to the AC output provided to campus 218.

Power inverter 204 may be configured to perform maximum power point tracking and/or anti-islanding. Maximum power point tracking may allow power inverter 204 to produce the maximum possible AC power from PV field 202. For example, power inverter 204 may sample the DC power output from PV field 202 and apply a variable resistance to find the optimum maximum power point. Anti-islanding is a protection mechanism that immediately shuts down power inverter 204 (i.e., preventing power inverter 204 from generating AC power) when the connection to an electricity-consuming load no longer exists.

PV field power inverter 204 can include any of a variety of circuit components (e.g., resistors, capacitors, indictors, transformers, transistors, switches, diodes, etc.) configured to perform the functions described herein. In some embodiments DC power from PV field 202 is connected to a transformer of PV field power inverter 204 through a center tap of a primary winding. A switch can be rapidly switched back and forth to allow current to flow back to PV field 202 following two alternate paths through one end of the primary winding and then the other. The alternation of the direction of current in the primary winding of the transformer can produce alternating current (AC) in a secondary circuit.

In some embodiments, PV field power inverter 204 uses an electromechanical switching device to convert DC power from PV field 202 into AC power. The electromechanical switching device can include two stationary contacts and a spring supported moving contact. The spring can hold the movable contact against one of the stationary contacts, whereas an electromagnet can pull the movable contact to the opposite stationary contact. Electric current in the electromagnet can be interrupted by the action of the switch so that the switch continually switches rapidly back and forth. In some embodiments, PV field power inverter 204 uses transistors, thyristors (SCRs), and/or various other types of semiconductor switches to convert DC power from PV field 202 into AC power. SCRs provide large power handling capability in a semiconductor device and can readily be controlled over a variable firing range.

In some embodiments, PV field power inverter 204 produces a square voltage waveform (e.g., when not coupled to an output transformer). In other embodiments, PV field power inverter 204 produces a sinusoidal waveform that matches the sinusoidal frequency and voltage of energy grid 212 or a sinusoidal waveform that has the frequency and voltage determined by controller 214. For example, PV field power inverter 204 can use Fourier analysis to produce periodic waveforms as the sum of an infinite series of sine waves. The sine wave that has the same frequency as the original waveform is called the fundamental component. The other sine waves, called harmonics, that are included in the series have frequencies that are integral multiples of the fundamental frequency.

In some embodiments, PV field power inverter 204 uses inductors and/or capacitors to filter the output voltage waveform. If PV field power inverter 204 includes a transformer, filtering can be applied to the primary or the secondary side of the transformer or to both sides. Low-pass filters can be applied to allow the fundamental component of the waveform to pass to the output while limiting the passage of the harmonic components. If PV field power inverter 204 is designed to provide power at a fixed frequency, a resonant filter can be used. If PV field power inverter 204 is an adjustable frequency inverter, the filter can be tuned to a frequency that is above the maximum fundamental frequency. In some embodiments, PV field power inverter 204 includes feedback rectifiers or antiparallel diodes connected across semiconductor switches to provide a path for a peak inductive load current when the switch is turned off. The antiparallel diodes can be similar to freewheeling diodes commonly used in AC/DC converter circuits.

In some embodiments, PV field power inverter 204 may be configured to automatically curtail (e.g., limit, reduce, etc.) the PV field power if the power supplied by energy grid 212 drops below a minimum value, $P_{EG,min}$. In some embodiments, controller 214 may be configured to detect if power provided by energy grid 212 drops below the minimum value $P_{EG,min}$. Controller 214 may then be configured to adjust PV power setpoint sent to PV field power inverter 204 so that PV field power inverter 204 curtails the PV field power.

Still referring to FIGS. 2-3, system 200 is shown to include an energy converter 208. Energy converter 208 may be configured to draw a DC power $P_{SS}$ from stationary storage device 206, convert the DC power $P_{SS}$ into an AC power $u_{SS}$, and provide the AC power $u_{SS}$ to POI 210. As used herein, the variable $u_{SS}$ denotes both the stationary storage power setpoint provided by controller 214 and the actual amount of power transferred from energy converter 208 to POI 210 as both are expected to have the same value. Energy converter 208 may also be configured to draw the AC power $u_{SS}$ from POI 210, convert the AC power $u_{SS}$ into a DC power $P_{SS}$, and store the DC power $P_{SS}$ in stationary storage device 206. As such, energy converter 208 can function as both a power inverter and a rectifier to convert between DC and AC in either direction. The DC power $P_{SS}$ may be positive if stationary storage 206 is providing power to energy converter 208 (i.e., if stationary storage device 206 is discharging) or negative if stationary storage device 206 is receiving power from energy converter 208 (i.e., if stationary storage device 206 is charging). Similarly, the AC power $u_{SS}$ may be positive if energy converter 208 is providing power to POI 210 or negative if energy converter 208 is receiving power from POI 210.

The PV field power $u_{PV}$, the power $u_{SS}$, and the energy grid power $P_{EG}$, combine at POI 210 to form $P_{campus}$ (i.e., $P_{campus}=u_{PV}u_{bat}+P_{EG}$), which represents the amount of power provided to campus 218. $P_{campus}$ may be positive if POI 210 is providing power to campus 218.

Like PV field power inverter 204, energy converter 208 can include any of a variety of circuit components (e.g., resistors, capacitors, indictors, transformers, transistors, switches, diodes, etc.) configured to perform the functions described herein. Energy converter 208 can include many of the same components as PV field power inverter 204 and can operate using similar principles. For example, energy converter 208 can use electromechanical switching devices, transistors, thyristors (SCRs), and/or various other types of semiconductor switches to convert between AC and DC power. Energy converter 208 can operate the circuit components to adjust the amount of power stored in stationary storage device 206 and/or discharged from stationary storage device 206 (i.e., power throughput) based on a power control signal or power setpoint from controller 214.

In some embodiments, stationary storage device 206 stores energy in various forms. For example, stationary storage device 206 may store energy via chemicals, electrolyzed hydrogen, magnetic fields, kinetic energy, etc. Energy converter 208 may be any device configured to convert the energy stored in stationary storage device 206 into electrical AC power, according to some embodiments. In some embodiments, stationary storage device 206 is a battery, and energy converter 208 is an inverter, as described in greater detail above.

Still referring to FIGS. 2-3, system 200 is shown to include controller 214. Controller 214 may be configured to generate a PV power setpoint $u_{PV}$ for PV field power inverter 204 and a power setpoint $u_{SS}$ for energy converter 208. As noted above, the variable $u_{PV}$ is used to refer to both the PV power setpoint generated by controller 214 and the AC power output of PV field power inverter 204 since both quantities have the same value. Similarly, the variable $u_{SS}$ is used to refer to both the stationary storage power setpoint generated by controller 214 and the AC power output/input of energy converter 208 since both quantities have the same value.

PV field power inverter 204 uses the PV power setpoint $u_{PV}$ to control an amount of the PV field power $P_{PV}$ to provide to POI 210. The magnitude of $u_{PV}$ may be the same as the magnitude of $P_{PV}$ or less than the magnitude of $P_{PV}$. For example, $u_{PV}$ may be the same as $P_{PV}$ if controller 214 determines that PV field power inverter 204 is to provide all of the photovoltaic power $P_{PV}$ to POI 210. However, $u_{PV}$ may be less than $P_{PV}$ if controller 214 determines that PV field power inverter 204 is to provide less than all of the photovoltaic power $P_{PV}$ to POI 210. For example, controller 214 may determine that it is desirable for PV field power inverter 204 to provide less than all of the photovoltaic power $P_{PV}$ to POI 210 to prevent the ramp rate from being exceeded and/or to prevent the power at POI 210 from exceeding a power limit. In some embodiments, a difference of $P_{PV}$ and $u_{PV}$ may be defined as $P_{PV,curtail}$ (i.e. $P_{PV,curtail} = P_{PV} - u_{PV}$). $P_{PV,curtail}$ may represent excess energy generated by PV field 202 which is dissipated (i.e., not used by campus 218).

Energy converter 208 uses the power setpoint $u_{SS}$ to control an amount of power charged or discharged by stationary storage device 206. The power setpoint $u_{SS}$ may be positive if controller 214 determines that energy converter 208 is to draw power from stationary storage device 206 or negative if controller 214 determines that energy converter 208 is to store power in stationary storage device 206. The magnitude of $u_{SS}$ controls the rate at which energy is charged or discharged by stationary storage device 206.

Controller 214 may generate $u_{PV}$ and $u_{SS}$ based on a variety of different variables including, for example, a power signal from PV field 202 (e.g., current and previous values for $P_{PV}$), the current state-of-charge (SOC) of stationary storage device 206, a maximum stationary storage device power limit (e.g., a maximum battery power limit), a maximum power limit at POI 210, the grid frequency of energy grid 212, and/or other variables that can be used by controller 214 to perform frequency regulation. An exemplary controller which can be used as controller 214 and exemplary processes which may be performed by controller 214 to generate the PV power setpoint $u_{PV}$ and the stationary storage device setpoint $u_{SS}$ (e.g., battery power setpoint $u_{bat}$) are described in detail in U.S. Provisional Patent Application No. 62/239,245 filed Oct. 8, 2015, the entire disclosure of which is incorporated by reference herein.

Controller 214 may be configured to generate and provide power setpoints to energy converter 208. Energy converter 208 may use the power setpoints to control the amount of power $u_{SS}$ provided to POI 210 or drawn from POI 210. For example, energy converter 208 may be configured to draw power from POI 210 and store the power in stationary storage device 206 in response to receiving a negative power setpoint from controller 214. Conversely, energy converter 208 may be configured to draw power from stationary storage device 206 and provide the power to POI 210 in response to receiving a positive power setpoint from controller 214. The magnitude of the power setpoint may define the amount of power $u_{SS}$ provided to or from energy converter 208.

In some embodiments, the power setpoints sent to energy converter 208 and PV field power inverter 204 by controller 214 correspond to at least one of a power factor and a discharge rate, a total complex power, or a discharge rate and a reactive power. The power setpoints sent to energy converter 208 and PV field power inverter 204 may compensate for the power factor of the campus 218 and the PV field 202 according to some embodiments. In some embodiments, the power setpoints sent to energy converter 208 and PV field power inverter 204 may improve the power factor of system 200.

Campus 218 may include one or more buildings 220 that receive power from point of interconnection 210. Buildings 220 may include equipment or devices that consume electricity during operation. For example, buildings 220 may include HVAC equipment, lighting equipment, security equipment, communications equipment, vending machines, computers, electronics, elevators, or other types of building equipment. In some embodiments, buildings 220 are served by a building management system (BMS). A BMS is, in general, a system of devices configured to control, monitor, and manage equipment in or around a building or building area. A BMS can include, for example, a HVAC system, a security system, a lighting system, a fire alerting system, and/or any other system that is capable of managing building functions or devices. An exemplary building management system which may be used to monitor and control buildings 220 is described in U.S. patent application Ser. No. 14/717,593, titled "Building Management System for Forecasting Time Series Values of Building Variables" and filed May 20, 2015, the entire disclosure of which is incorporated by reference herein.

In some embodiments, campus 218 includes a central plant 222. Central plant 222 may include one or more subplants that consume resources from utilities (e.g., water, natural gas, electricity, etc.) to satisfy the loads of buildings 220. For example, central plant 222 may include a heater subplant, a heat recovery chiller subplant, a chiller subplant, a cooling tower subplant, a hot thermal energy storage (TES) subplant, and a cold thermal energy storage (TES) subplant, a steam subplant, and/or any other type of subplant configured to serve buildings 220. The subplants may be configured to convert input resources (e.g., electricity, water, natural gas, etc.) into output resources (e.g., cold water, hot water, chilled air, heated air, etc.) that are provided to buildings 220. An exemplary central plant which may be used to satisfy the loads of buildings 220 is described U.S. patent application Ser. No. 14/634,609, titled "High Level Central Plant Optimization" and filed Feb. 27, 2015, the entire disclosure of which is incorporated by reference herein.

Controller

Figure 4:
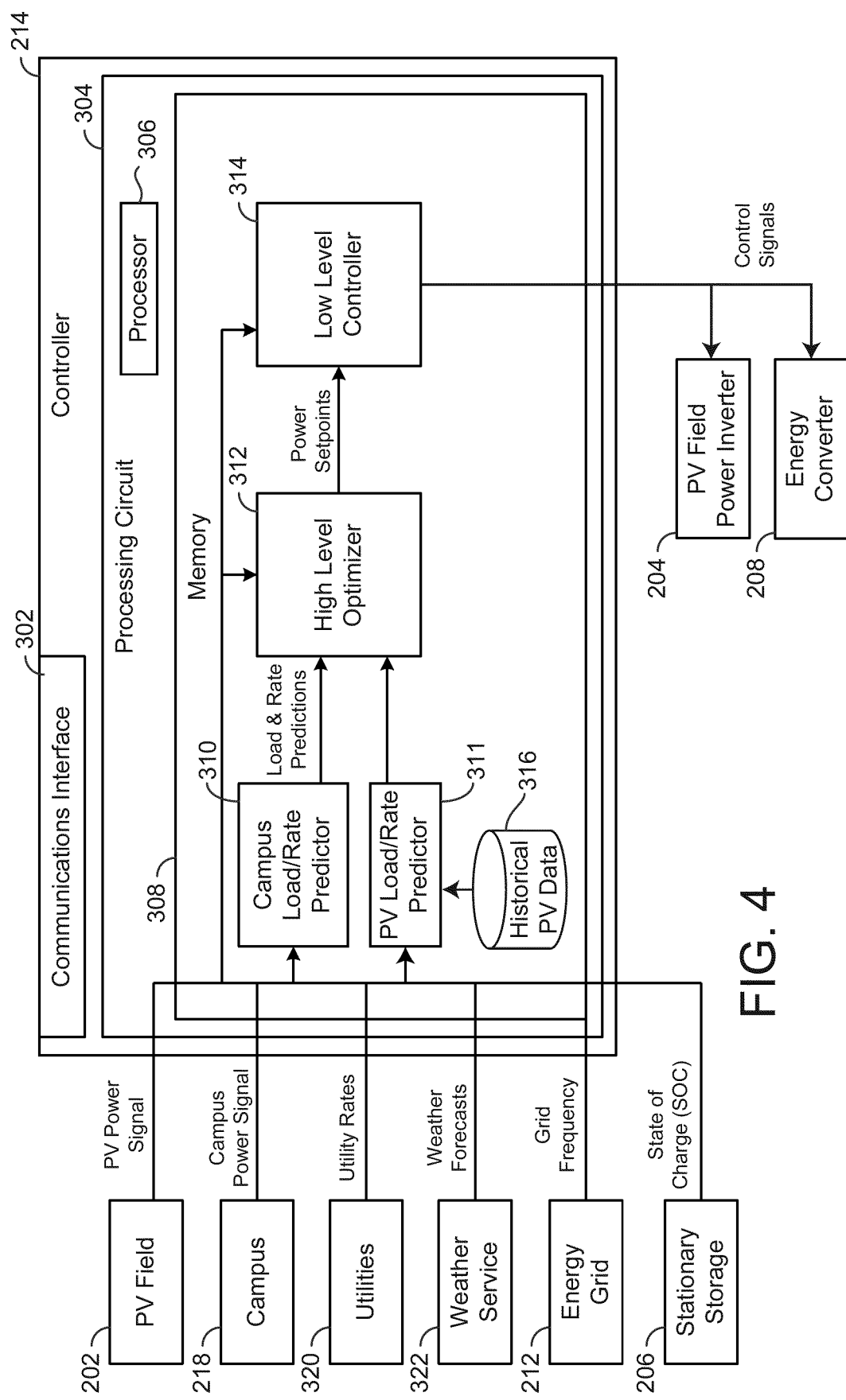
FIG. 4 is a block diagram of the controller of FIG. 3, shown to include high level optimizer, according to some embodiments.

Referring now to FIG. 4, a block diagram 300 illustrating controller 214 in greater detail is shown, according to an exemplary embodiment. Controller 214 may be configured to perform an optimization process to generate power setpoints and control signals for PV field power inverter 204 and energy converter 208. In some embodiments, controller 214 generates power setpoints and control signals for PV field power inverter 204 and energy converter 208 periodically using a predictive optimization scheme (e.g., once every half hour, once per frequency response period, etc.). Controller 214 may also calculate and update power setpoints for PV field power inverter 204 and energy converter

208 periodically during each frequency response period (e.g., once every two seconds).

In the optimization process, a high level optimizer 312 determines optimal values for the power setpoints by performing a high level optimization. High level optimizer 312 may determine a power setpoint to maintain a constant state-of-charge in stationary storage device 206 (i.e., the same state-of-charge at the beginning and end of each frequency response period) or to vary the state-of-charge in order to optimize the overall value of system 200 (e.g., frequency response revenue minus energy costs and battery degradation costs). In some embodiments, high level optimizer 312 determines power setpoints to minimize a cost function. High level optimizer 312 may run at a period on the order of 15 minutes according to some embodiments. In some embodiments, the period of high level optimizer 312 is a longer time interval than the period of low level controller 314.

Low level controller 314 uses the power setpoints from high level optimizer 312 to generate control signals for PV field power inverter 204 and energy converter 208 according to some embodiments. Accordingly, low level controller 314 may be implemented as a stationary storage controller and/or a power inverter controller. In some embodiments, the power setpoints from high level optimizer 312 correspond to a power factor and a discharge rate, a total complex power, or a discharge rate and a reactive power of PV field power inverter 204 and/or energy converter 208. The power setpoints from high level optimizer 312 may also be a demand target, and/or a stationary storage discharge rate, according to some embodiments. Low level controller 314 may generate and send the control signals to PV field power inverter 204 and energy converter 208 to achieve the power setpoints from high level optimizer 312. In some embodiments, the control signals send by low level controller 314 may be a stationary storage device discharge rate, and/or a reactive power supplied. In some embodiments, low level controller 314 may measure reactive and/or real power of PV field power inverter 204 and/or energy converter 208, the load of campus 218, the PV field power of PV field 202, and the stationary storage device 206 charge or discharge rate. Low level controller 314 may provide high level optimizer 312 with this information for use in the high level optimization.

In some embodiments, low level controller 314 may operate on a small time period (e.g., 2 seconds). Low level controller 314 may measure (or calculate) real, reactive, and apparent power from the stationary storage device 206, PV field 202, campus 218, and energy grid 212 according to some embodiments. Low level controller 314 may supply these power values to high level optimizer 312, according to some embodiments. In some embodiments, low level controller 314 may produce energy converter 208 setpoints which follow setpoints recommended by high level optimizer 312 if power from energy grid 212 will stay above a minimum value, $P_{EG,min}$. If power from energy grid 212 will not stay above the minimum value $P_{EG,min}$ given the setpoints recommended by high level optimizer 312, low level controller 314 may maintain a demand target or a minimum import value of energy grid 212, according to some embodiments.

Still referring to FIG. 4, controller 214 is shown to include a communications interface 302 and a processing circuit 304. Communications interface 302 may include wired or wireless interfaces (e.g., jacks, antennas, transmitters, receivers, transceivers, wire terminals, etc.) for conducting data communications with various systems, devices, or networks. For example, communications interface 302 may include an Ethernet card and port for sending and receiving data via an Ethernet-based communications network and/or a Wi-Fi transceiver for communicating via a wireless communications network. Communications interface 302 may be configured to communicate via local area networks or wide area networks (e.g., the Internet, a building WAN, etc.) and may use a variety of communications protocols (e.g., BACnet, IP, LON, etc.).

Communications interface 302 may be a network interface configured to facilitate electronic data communications between controller 214 and various external systems or devices (e.g., campus 218, energy grid 212, PV field power inverter 204, energy converter 208, PV field 202, utilities 320, weather service 322, etc.). For example, controller 214 may receive a campus power signal from campus 218, utility rates from utilities 320, and weather forecasts from weather service 322 via communications interface 302. Controller 214 may provide control signals corresponding to power setpoints to PV field power inverter 204 and energy converter 208 via communications interface 302.

Still referring to FIG. 4, processing circuit 304 is shown to include a processor 306 and memory 308. Processor 306 may be a general purpose or specific purpose processor, an application specific integrated circuit (ASIC), one or more field programmable gate arrays (FPGAs), a group of processing components, or other suitable processing components. Processor 306 may be configured to execute computer code or instructions stored in memory 308 or received from other computer readable media (e.g., CDROM, network storage, a remote server, etc.).

Memory 308 may include one or more devices (e.g., memory units, memory devices, storage devices, etc.) for storing data and/or computer code for completing and/or facilitating the various processes described in the present disclosure. Memory 308 may include random access memory (RAM), read-only memory (ROM), hard drive storage, temporary storage, non-volatile memory, flash memory, optical memory, or any other suitable memory for storing software objects and/or computer instructions. Memory 308 may include database components, object code components, script components, or any other type of information structure for supporting the various activities and information structures described in the present disclosure. Memory 308 may be communicably connected to processor 306 via processing circuit 304 and may include computer code for executing (e.g., by processor 306) one or more processes described herein.

Still referring to FIG. 4, controller 214 is shown to include a campus load/rate predictor 310 and a PV load/rate predictor 311 according to some embodiments. Campus load/rate predictor 310 may be configured to predict the electric load of campus 218 (i.e., $\hat{P}_{campus}$) for each time step k (e.g., k=1 . . . n) within an optimization window and PV load/rate predictor 311 may be configured to predict the electric generation of PV field 202 (i.e., $\hat{P}_{PV}$) for each time step k (e.g., k=1 . . . n) within an optimization window. In some embodiments, the electric load of campus 218 and the electric generation of PV field 202 (i.e., $\hat{P}_{campus}$ and $\hat{P}_{PV}$) is predicted for each time step k (e.g., k=1 . . . n) within a same optimization window. Campus load/rate predictor 310 and PV load/rate predictor 311 are shown receiving PV power signal from PV field 202, campus power signal from campus 218, utility rates from utilities 320, weather forecasts from weather service 322, grid frequency from energy grid 212, and state of charge from stationary storage device 206, according to some embodiments. In some embodiments, each of campus load/rate predictor 310 and PV load/rate predictor 311 may use any of the PV power signal, campus power signal, utility rates, weather forecasts, grid frequency, and state of charge to predict the campus load/rate and/or the PV load/rate. High level optimizer 312 may also use any of these input information in the high level optimization to determine power setpoints.

Campus load/rate predictor 310 is shown receiving weather forecasts from a weather service 322. In some embodiments, campus load/rate predictor 310 predicts $\hat{P}_{campus}$ as a function of the weather forecasts. In some embodiments, campus load/rate predictor 310 uses feedback from campus 218 to predict $\hat{P}_{campus}$. Feedback from campus 218 may include various types of sensory inputs (e.g., temperature, flow, humidity, enthalpy, etc.) or other data relating to buildings 220 and/or central plant 222 (e.g., inputs from a HVAC system, a lighting control system, a security system, a water system, etc.). Campus load/rate predictor 310 may predict one or more different types of loads for campus 218. For example, load/rate predictor 310 may predict a hot water load, a cold water load, and/or an electric load for each time step k within the optimization window.

In some embodiments, campus load/rate predictor 310 receives a measured electric load and/or previous measured load data from campus 218. For example, campus load/rate predictor 310 is shown receiving a campus power signal from campus 218. The campus power signal may indicate the measured electric load of campus 218. Campus load/rate predictor 310 may predict one or more statistics of the campus power signal including, for example, a mean campus power $\mu_{campus}$ and a standard deviation of the campus power $\sigma_{campus}$. Campus load/rate predictor 310 may predict $\hat{P}_{campus}$ as a function of a given weather forecast ($\hat{\phi}_w$), a day type (clay), the time of day (t), and previous measured load data ($Y_{k-1}$). Such a relationship is expressed in the following equation:

$$\hat{P}_{campus} = f(\hat{\phi}_w, day, t | Y_{k-1})$$

In some embodiments, campus load/rate predictor 310 uses a deterministic plus stochastic model trained from historical load data to predict $\hat{P}_{campus}$. Campus load/rate predictor 310 may use any of a variety of prediction methods to predict $P_{campus}$ (e.g., linear regression for the deterministic portion and an AR model for the stochastic portion). In some embodiments, load/rate predictor 310 makes load/rate predictions using the techniques described in U.S. patent application Ser. No. 14/717,593, titled "Building Management System for Forecasting Time Series Values of Building Variables" and filed May 20, 2015. In some embodiments, campus load/rate predictor 310 is trained to predict $\hat{P}_{campus}$ using a machine learning algorithm and historical load data. In some embodiments, the machine learning algorithm is any of a linear regression, a partial least squares regression, a logistic regression, a linear discriminant analysis, a decision tree, a Naïve Bayes algorithm, a K-Nearest Neighbors algorithm, a learning vector quantization algorithm, a support vector machines algorithm, a Random Forest algorithm, a Boosting algorithm, etc., or any other machine learning algorithm.

Campus load/rate predictor 310 is shown receiving utility rates from utilities 320. Utility rates may indicate a cost or price per unit of a resource (e.g., electricity, natural gas, water, etc.) provided by utilities 320 at each time step k in the optimization window. In some embodiments, the utility rates are time-variable rates. For example, the price of electricity may be higher at certain times of day or days of the week (e.g., during high demand periods) and lower at other times of day or days of the week (e.g., during low demand periods). The utility rates may define various time periods and a cost per unit of a resource during each time period. Utility rates may be actual rates received from utilities 320 or predicted utility rates estimated by campus load/rate predictor 310.

In some embodiments, the utility rates include demand charges for one or more resources provided by utilities 320. A demand charge may define a separate cost imposed by utilities 320 based on the maximum usage of a particular resource (e.g., maximum energy consumption) during a demand charge period. The utility rates may define various demand charge periods and one or more demand charges associated with each demand charge period. In some instances, demand charge periods may overlap partially or completely with each other and/or with the prediction window. Advantageously, controller 214 may be configured to account for demand charges in the high level optimization process performed by high level optimizer 312. Utilities 320 may be defined by time-variable (e.g., hourly) prices, a maximum service level (e.g., a maximum rate of consumption allowed by the physical infrastructure or by contract) and, in the case of electricity, a demand charge or a charge for the peak rate of consumption within a certain period. Campus load/rate predictor 310 may store the predicted campus power $\hat{P}_{campus}$ and the utility rates in memory 308 and/or provide the predicted campus power $\hat{P}_{campus}$ and the utility rates to high level optimizer 312.

PV load/rate predictor 311 is shown receiving weather forecasts from a weather service 322. In some embodiments, PV load/rate predictor 311 receives weather forecasts from weather service 322 from the past year, and receives historical PV production capacity from PV field 202 or from historical PV database 316. In some embodiments, historical PV database 316 may contain data regarding average monthly power generated by PV field 202, or an expected monthly power generation from PV field 202. PV load/rate predictor 311 may also receive data from the National Residential Efficiency Measures Database (NREL) according to some embodiments. In some embodiments, PV load/rate predictor 311 predicts $\hat{P}_{PV}$ as a function of the weather forecasts. In some embodiments, PV load/rate predictor 311 uses a deterministic plus stochastic model trained from historical weather and PV production data to predict $\hat{P}_{PV}$. PV load/rate predictor 311 may use any of a variety of prediction methods to predict $P_{PV}$ (e.g., linear regression for the deterministic portion and an AR model for the stochastic portion). In some embodiments, PV load/rate predictor 311 makes load/rate predictions using the techniques described in U.S. patent application Ser. No. 15/247,869, titled "Photovoltaic Energy System with Solar Intensity Prediction" and filed Aug. 25, 2016, the entirety of which is incorporated by reference herein. In some embodiments, PV load/rate predictor 311 is trained to predict $\hat{P}_{campus}$ using a machine learning algorithm with PV production data and weather data. In some embodiments, the machine learning algorithm is any of a linear regression, a partial least squares regression, a logistic regression, a linear discriminant analysis, a decision tree, a Naïve Bayes algorithm, a K-Nearest Neighbors algorithm, a learning vector quantization algorithm, a support vector machines algorithm, a Random Forest algorithm, a Boosting algorithm, etc., or any other machine learning algorithm.

High Level Optimizer

Still referring to FIG. 4, controller 214 is shown to include high level optimizer 312. High level optimizer 312 may be configured to generate power setpoint values for low level controller 314. In some embodiments, high level optimizer 312 determines power setpoints that will cause stationary storage device 206 to have the same state-of-charge (SOC) at the beginning and end of each frequency response period. In other embodiments, high level optimizer 312 performs an optimization process to generate power setpoints For example, high level optimizer 312 may generate setpoints using an optimization procedure that allows the SOC of stationary storage device 206 to vary and/or have different values at the beginning and end of the frequency response period. High level optimizer 312 may use the SOC of stationary storage device 206 as a constrained variable in order to optimize a value function that takes into account energy costs.

High level optimizer 312 may determine power setpoints that minimize a cost associated with purchasing electrical energy from energy grid 212 according to some embodiments. The cost associated with purchasing electrical energy from energy grid 212 may be defined as cost function J, where J is the total operating cost of a system across a time horizon (e.g., one month, one year, one day, etc.). The system can include any of the systems or devices previously described (e.g., PV field 202, campus 218, buildings 220, central plant 222, energy grid 212, stationary storage device 206, etc.) according to some embodiments. In some embodiments, k may be defined as a time element of the time horizon or a time step subset. According to some embodiments, k may have any time value (e.g., a minute, a half-hour, an hour, etc.) and may be less than the time horizon. The cost function may also be subject to various constraints, according to some embodiments, and described further with reference to FIG. 5. In some embodiments, the cost function and the constraints may define an optimization problem which may include four decision variables for each element of the time horizon, as well as a demand charge variable. The four decision variables may be $P_{EG,k}$, the purchased kW from energy grid 212, $u_{SS,k}$, the discharge rate from stationary storage device 206, $e_{SOC,k}$, the stored amount of energy in stationary storage device 206 (e.g., kWh), and $P_{unmet,k}$, a slack variable used when the required campus load cannot be met. The cost function may be an objective function to be minimized, and may be defined as:

$$J = \sum_{k \in \text{time horizon}} r_k P_{EG,k} + w r_{demand,k} P_{max}$$

In the cost function shown above, $r_k$ is a factor corresponding to a price of energy from the energy grid 212, $P_{EG,k}$ is the purchased kW from energy grid 212, w is a weighting factor to normalize the demand charge to be prorated for the same amount of time as the energy costs that are summed (i.e., the time horizon), $r_{demand,k}$ is a factor corresponding to a price of demand energy rate (i.e., a demand charge rate), and $P_{max}$ is a maximum energy rate drawn from energy grid 212 during a demand energy time period (i.e., the maximum value of $P_{EG,k}$ at any time within a demand charge period). The variables $P_{PV}$ and/or $u_{PV}$ are not included in the cost function shown above, because power generated by the PV field 202 does not incur costs.

Figure 5:
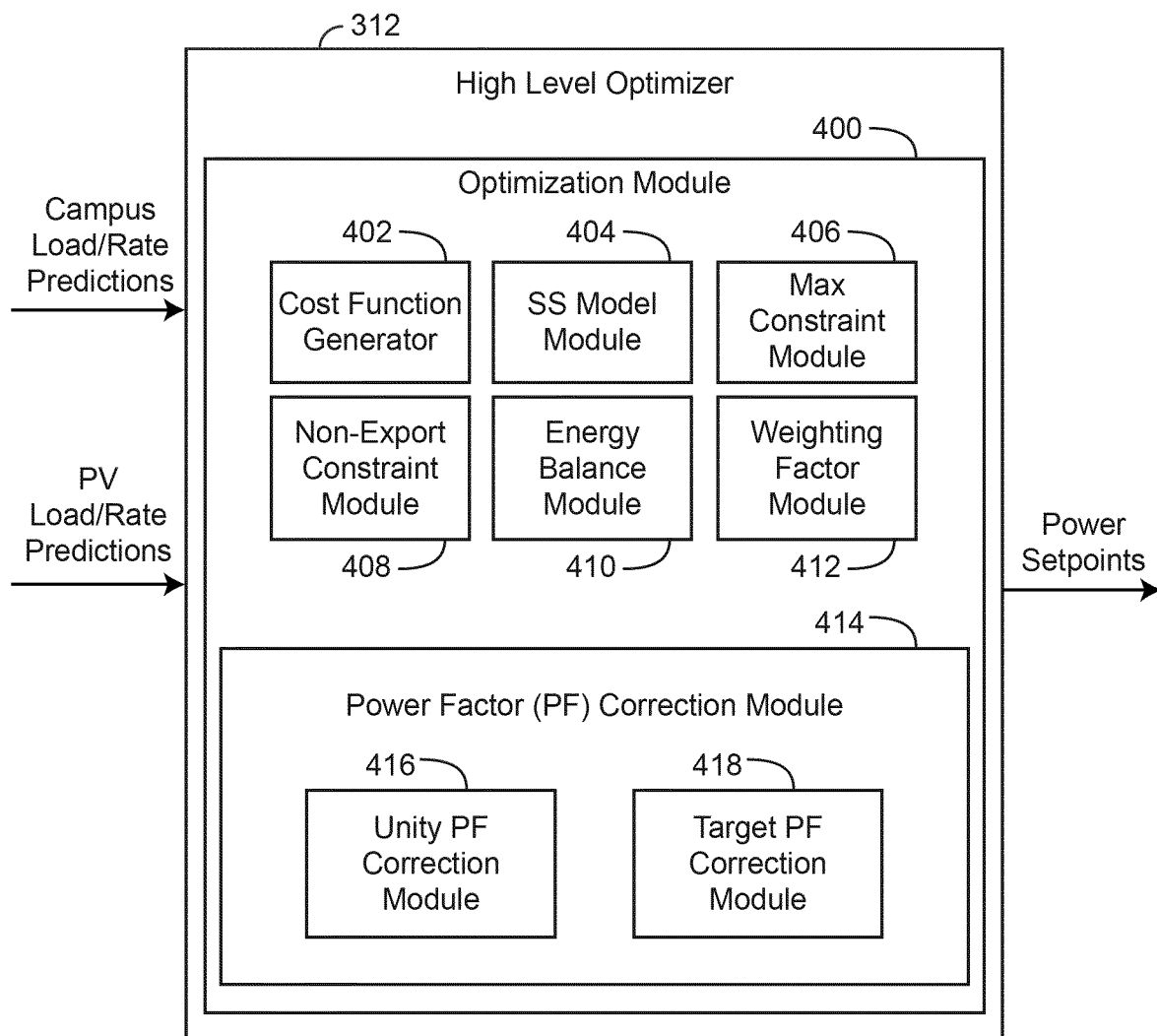
FIG. 5 is block diagram of the high level optimizer of FIG. 4, shown in greater detail, according to some embodiments.

Referring now to FIG. 5, a block diagram illustrating high level optimizer 312 in greater detail is shown, according to an exemplary embodiment. High level optimizer 312 is shown to include an optimization module 400, and a power factor correction module 414. In some embodiments, optimization module 400 may be configured to produce the cost function, apply constraints to the cost function, and optimize the cost function (i.e., determine decision variables which minimize the cost function). High level optimizer 312 may then output power setpoints to low level controller 314 to implement the decision variables which minimize the cost function according to some embodiments.

Optimization module 400 is shown to include cost function generator 402 according to some embodiments. Cost function generator 402 may be configured to generate the cost function according to some embodiments. In some embodiments, the cost function may be defined as cost function J (as shown above with reference to FIG. 4) and may determine the total cost of operating campus 218.

Optimization module 400 is also shown to include stationary storage model module 404 according to some embodiments. In some embodiments, stationary storage model module 404 is configured to determine constraints for the cost function based on a model of the stationary storage device 206. In some embodiments, stationary storage model module 404 is configured to determine more than one constraint related to the state of charge, energy capacity, and discharge rate of the stationary storage device 206.

Stationary storage model module 404 may determine a state of charge constraint, defined as:

$$e_{SOC,k} - u_{SS,k\Delta t} = e_{SOC,k+1}$$

In the state of charge constraint shown above, $e_{SOC,k}$ is the state of charge of stationary storage device 206 during time interval k, $u_{SS,k\Delta t}$ is the amount of energy discharge by stationary storage device 206 during time interval k, and $e_{SOC,k+1}$ is the state of charge of stationary storage device 206 during time interval k+1.

Stationary storage model module 404 may also determine a capacity constraint according to some embodiments. In some embodiments, the capacity constraint may be defined as:

$$0 + \text{storage margin} < e_{SOC,k} < \text{energy capacity} - \text{storage margin}$$

In the capacity constraint shown above, $e_{SOC,k}$ is the state of charge of stationary storage device 206 during time interval k, storage margin is a value which prevents the stationary storage device 206 from being fully charge or completely empty, and energy capacity is a maximum capacity of energy which stationary storage device 206 may contain according to some embodiments. For example, stationary storage device 206 may have an energy capacity of 100 Amp-hrs, according to some embodiments. In some embodiments, it may be desired for the storage margin to be 2%. This results in stationary storage device 206 having an energy capacity between 2 Amp-hrs and 98 Amp-hrs, or between 2% and 98%, respectively. This may prevent optimization module 400 from determining a solution where stationary storage device 206 is fully discharged at any time.

Stationary storage model module 404 may also determine a charge rate constraint, according to some embodiments. The charge rate constraint may be defined as:

$$-\text{maximum charge rate} < u_{SS,k} < \text{maximum discharge rate}$$

In the charge rate constraint shown above, $u_{SS,k}$, is the rate of charge or discharge of stationary storage device 206, according to some embodiments. The charge rate constraint may prevent optimization module 400 from determining a solution where stationary storage device 206 charges at a rate greater than the absolute value of the maximum charge rate of stationary storage device 206 (−maximum charge rate<$u_{SS,k}$) and may prevent optimization module 400 from determining a solution where stationary storage device 206 discharges at a rate greater than the absolute value of the maximum discharge rate of stationary storage device 206 ($u_{SS,k}$<maximum discharge rate). In some embodiments, maximum charge rate is the maximum possible rate at which stationary storage device 206 may charge, and maximum discharge rate is the maximum possible rate at which stationary storage device 206 may discharge.

Stationary storage model module 404 may also provide a stationary storage charge constraint. The stationary storage charge constraint may ensure that the optimization module 400 does not determine a solution which requires the stationary storage device 206 to be charged from a source other than the PV field 202. In some embodiments, the stationary storage device 206 may only charge from the PV field 202. For example, the optimization module 400 may require the stationary storage device 206 to charge at a rate less than or equal to the rate at which power is generated by PV field 202. In some embodiments, the stationary storage charge constraint may be defined as:

$$-u_{SS,k} \leq u_{PV,k}$$

In the stationary storage charge constraint shown above, $u_{SS,k}$ is the discharge rate of the stationary storage device 206 at time interval k, (such that negative values of $u_{SS,k}$ represent positive charge rates) and $u_{PV,k}$ is the power output from PV field 202 at time interval k, according to some embodiments.

Still referring to FIG. 5, optimization module 400 is shown to include non-export constraint module 408, according to some embodiments. Non-export constraint module 408 may determine a non-export constraint according to some embodiments. The non-export constraint may be defined as:

$$\text{minimum import} < P_{EG,k} < \text{demand limit}$$

In the non-export constraint shown above, $P_{EG,k}$ is power supplied by energy grid 212 to the point of interconnection 210, and consequently to campus 218. The non-export constraint ensures that the power supplied by energy grid is not less than a minimum value, minimum import. In some embodiments, the minimum value is zero, or a near-zero positive number. This constraint ensures that optimization module 400 does not determine a solution which requires exporting power to the energy grid 212. Additionally, the non-export constraint ensures that the optimization module 400 does not determine a solution which requires drawing more power from energy grid 212 than demand limit. The non-export constraint may protect the electrical equipment and may maintain stability of the energy grid 212, according to some embodiments.

Still referring to FIG. 5, optimization module 400 is shown to include demand charge module 406, according to some embodiments. In some embodiments, demand charge module 406 may be configured to impose a demand charge constraint that defines the amount of power used to calculate the demand charge. The demand charge constraint can be formulated as shown in the following equation:

$$P_{EG,max} \geq P_{EG,k}$$

In the constraint shown above, $P_{EG,max}$ is constrained to be greater than or equal to the power drawn from energy grid 212 at each time interval k, according to some embodiments. Accordingly, optimization module 400 will set $P_{EG,max}$ to be equal to the maximum value of $P_{EG,k}$ that occurs at any time interval k when optimizing the cost function J in an attempt to reduce the calculated demand charge. This constraint is equivalent to the non-linear constraint $P_{EG,max}=\max(P_{EG,k})$ (k=1 ... h) without requiring the non-linear "max" operator.

Still referring to FIG. 5, optimization module 400 is shown to include energy balance module 410, according to some embodiments. In some embodiments, energy balance module 410 may be configured to determine an energy balance constraint, defined as:

$$P_{EG,k}+u_{SS,k}+P_{unmet,k}+u_{PV,k}=P_{load,k}+P_{PV,curtail,k}$$

In the energy balance constraint shown above, $P_{EG,k}$ is the power supplied from the energy grid 212, $u_{SS,k}$ is the power supplied from the discharge of the stationary storage device 206, $u_{PV,k}$ is the power supplied by the PV field 202, and $P_{load,k}$ is the power required by the campus 218. Additionally, $P_{unmet,k}$ is added in order to ensure that optimization module 400 can achieve a solution, even if the power required by the campus is greater than the power that the energy grid 212, stationary storage device 206, and PV field 202 can provide, given the above mentioned constraints. In this way, $P_{unmet,k}$ may ensure that the energy balance constraint can be met and may represent an amount of power still required by campus 218 which has not yet been provided to campus 218. Conversely, if the campus 218 requires less power than the power provided by energy grid 212, stationary storage device 206, and PV field 202, $P_{PV,curtail,k}$ may act as an energy sink and allow optimization module 400 to still achieve a solution. The variable $P_{PV,curtail,k}$ represents the energy or power dissipated from energy converter 208 and/or PV field power inverter 204 if the power supplied by energy converter 208 (i.e., $u_{SS,k}$) or the power supplied by PV field power inverter 204 (i.e., $P_{PV,k}$) exceeds required campus power.

Still referring to FIG. 5, optimization module may include weighting factor module 412, according to some embodiments. Weighting factor module 412 may calculate the weighting factor, w, shown in the cost function. The weighting factor w may normalize the demand charge to be prorated for the same amount of time as the energy costs that are summed (i.e., the time horizon of the cost function), according to some embodiments. In some embodiments, the weighting factor w, or the cost function may be calculated or determined using any the techniques described in U.S. patent application Ser. No. 14/634,599, titled "Incorporating A Demand Charge In Central Plant Optimization" and filed Feb. 27, 2015, the entirety of which is incorporated by reference herein.

Still referring to FIG. 5, optimization module 400 is shown to include power factor correction module 414, according to some embodiments. In some embodiments, power factor correction module 414 may be configured to provide additional constraints to the cost function in order to ensure that the power factor seen by the energy grid 212 is not adversely affected, or to guarantee that the power factor is above a certain target. In some embodiments, optimization module 400 does not include power factor correction module 414. Power factor may be defined as average power factor, defined by average power factor equation:

$$\overline{PF} = \frac{\sum P_{EG,k}}{\sum (P_{EG,k}^2 + Q_{EG,k}^2)}$$

In the power factor equation shown above, $\overline{PF}$ is average power factor, $P_{EG,k}$ is active/real power of energy grid 212, and $Q_{EG,k}$ is reactive power of energy grid 212.

Figure 6:
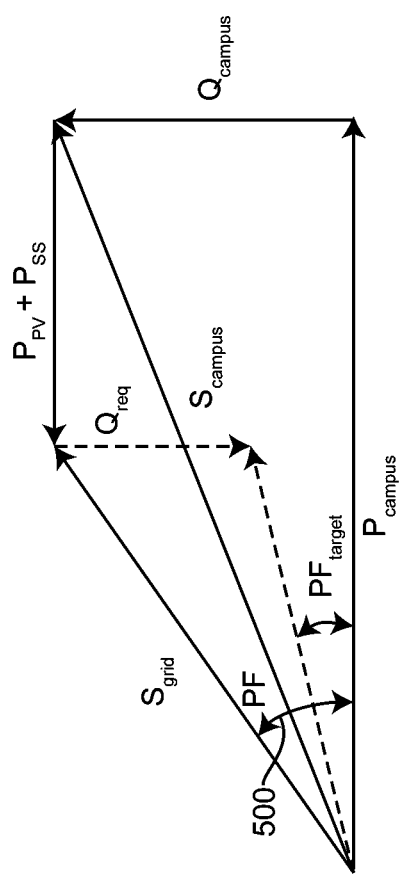
FIG. 6 is a phasor diagram of an operation of high level optimizer of FIG. 4, according to some embodiments.

Referring now to FIGS. 5-6, power factor correction module 414 is shown to include unity power factor correction module 416. As shown in the phasor diagram shown in FIG. 6, as PV field 202 and stationary storage device 206 offset power supplied to the campus 218 ($P_{PV}$+$P_{SS}$), the power factor decreases (i.e., angle 500 increases). In the phasor diagram shown in FIG. 6, $P_{SS}$ represents the real power supplied by stationary storage device 206 and $Q_{SS}$ represents the reactive power supplied by stationary storage device 206, according to some embodiments. In order to compensate for this, energy converter 208 and/or PV field power inverter 204 must apply power to campus 218 at a leading power factor. Unity power factor correction module 416 may be configured to determine power setpoints for PV field power inverter 204 and/or energy converter 208 such that a unity power factor results according to some embodiments. In some embodiments, unity power factor correction module 416 may provide constraints such that the power setpoints determined by optimization module 400 result in a unity power factor. Unity power factor correction module 416 may provide a unity power factor constraint, defined as:

$$Q_{req,k} = -Q_{campus,k}$$

In the unity power factor constraint shown above, $Q_{req,k}$, is reactive power required to be provided by the energy converter 208 and/or the PV field power inverter 204, according to some embodiments. $Q_{campus,k}$ represents the reactive power supplied by campus 218, according to some embodiments. Unity power factor constraint ensures that the energy converter 208 and/or the PV field power inverter 204 provide reactive power equal to $-Q_{campus,k}$ at every instant in time. As can be seen in FIG. 6, if $Q_{req,k} = -Q_{campus,k}$ at every instant in time, angle 500 equals 0 degrees at every instant in time, and as such the power factor is unity at every instant in time.

To guarantee that at least the energy converter 208 can supply a current required to achieve $-Q_{campus,k}$, a constraint may be added to bound the stationary storage device 206, according to some embodiments. The constraint to bound the stationary storage device 206 may be defined as:

$$abs(P_{SS}) \leq \sqrt{P_{design}^2 - Q_{campus}^2}$$

In the constraint to bound the stationary storage device 206 above, $P_{SS}$ is active/real discharge power of stationary storage device 206, $P_{design}$ is active/real design power of energy converter 208, and $Q_{campus}$ is reactive power of campus 218. Since the active/real design power of the energy converter 208 and the reactive power of campus 218 are known, the constraint to bound the stationary storage device 206 translates to two linear constraints on the cost function.

Referring still to FIG. 5-6, optimization module 400 is shown to include PF correction module 414 according to some embodiments. In some embodiments, PF correction module 414 is configured to provide constraints such that the power setpoints determined by optimization module 400 achieve a specific power factor target. One difficulty with achieving the power factor target arises because reactive power from the energy converter 208 required to achieve the specific power factor target depends on the charge and discharge of stationary storage device 206. If the time horizon is sufficiently long, the average power charged and discharged from stationary storage device 206 approaches zero.

The energy converter 208 is rated for a specific apparent power in Volt-Amps according to some embodiments. A constraint on the reactive power and real power provided by the energy converter 208 may be generally defined as a capacity constraint:

$$Q_{req}^2 + P_{SS}^2 < P_{design}^2$$

In the capacity constraint shown above, $Q_{req}$ is the reactive power provided by energy converter 208 to achieve the target power factor, $P_{SS}$ is the real/active power discharged by stationary storage device 206, and $P_{design}$ is a design real power of energy converter 208 (i.e., a maximum real power).

Additionally, average monthly power factor must be maintained. The average monthly power factor may be maintained by a power factor constraint defined as:

$$PF_{target} < \frac{\sum (P_{campus,k} - P_{PV,k} - P_{SS,k})}{\sum \sqrt{(P_{campus,k} - P_{PV,k} - P_{SS,k})^2 + (Q_{campus} - Q_{req})^2}}$$

In the above constraint, $P_{PV,k}$ represents the real/active power supplied by PV field power inverter 204, according to some embodiments. Satisfying the above constraint over a one month average is guaranteed if it is satisfied at each time interval. A constraint to satisfy the above constraint at each time interval may be defined as:

$$PF_{target} < \frac{(P_{campus,k} - P_{PV,k} - P_{SS,k})}{\sqrt{(P_{campus,k} - P_{PV,k} - P_{SS,k})^2 + (Q_{campus} - Q_{req})^2}}$$

Since the real power discharged by stationary storage device 206 over the one month period will average (i.e., integrate) to zero or near zero, $P_{SS,k}$ may be eliminated from the above constraint, yielding a target power factor constraint defined as:

$$PF_{target} < \frac{(P_{campus,k} - P_{PV,k})}{\sqrt{((P_{campus,k} - P_{PV,k})^2 + (Q_{campus} - Q_{req})^2)}}$$

The capacity constraint and any of the power factor constraints may form a valid operating region in $P_{SS}$ and $Q_{discharge}$ space for the stationary storage device 206.

Figure 7A:
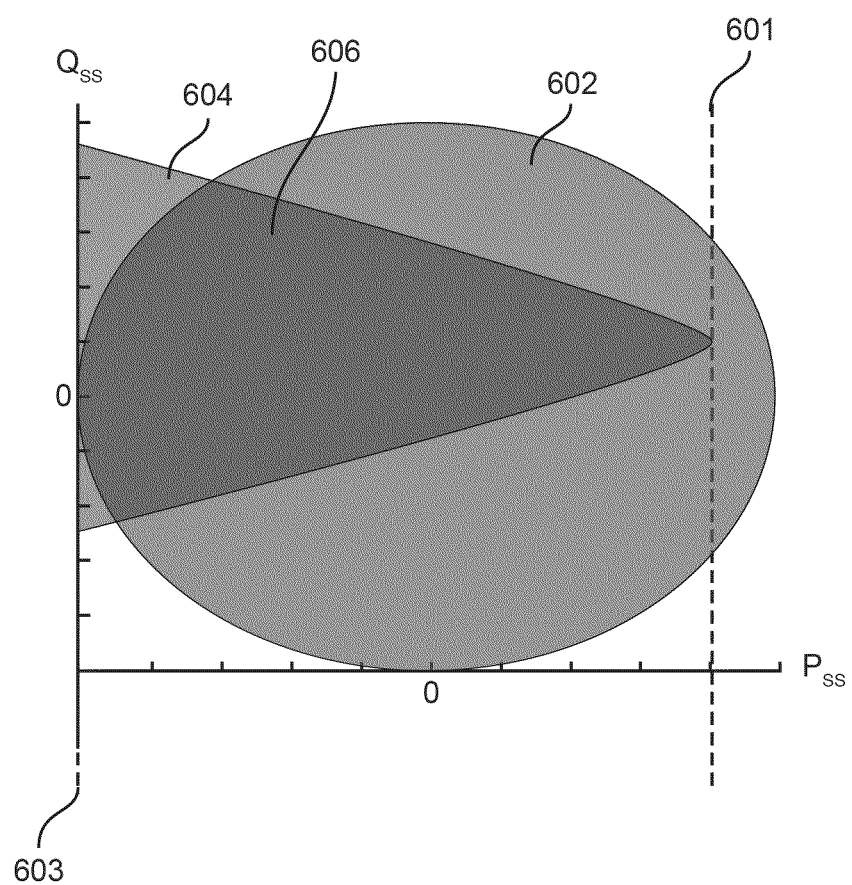
FIG. 7a is a graph of real and reactive power of the energy converter of FIGS. 2-3, according to some embodiments.
Figure 7B:
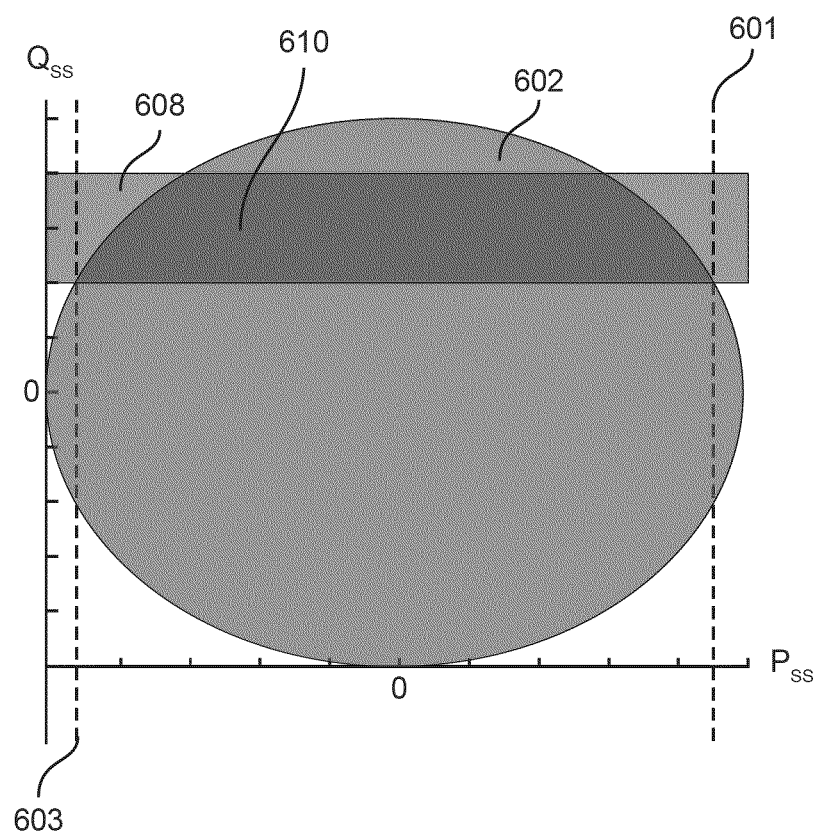
FIG. 7b is a graph of real and reactive power of the energy converter of FIGS. 2-3, according to some embodiments.

Referring now to FIGS. 7a-7b, graphs of a valid operating region for the stationary storage device 206 to meet the target power factor are shown, according to some embodiments. FIG. 7a may represent a valid operating region for the stationary storage device 206 with the capacity constraint shown above and the monthly power factor constraint, including the real power discharge of stationary storage device 206. Shaded region 602 represents the operating region of the energy converter 208, given the capacity constraint. Shaded region 604 may represent the operating region necessary to meet the target power factor, according to some embodiments. In some embodiments, shaded region 606 represents an overlap of shaded region 604 and shaded region 602, such that, if the energy converter 208 operates within shaded region 606, the capacity constraint and the power factor constraint, including the energy converter discharge term, are met. The capacity constraint remains constant for the entire time horizon, and therefore the shaded region 602 may remain constant according to some embodiments. The power factor constraint, however, may be dependent on measurements and may need to be recalculated for every time element of the high level optimizer 312 time horizon. A valid range of real power discharge rate of the stationary storage device 206 (i.e., $P_{SS}$), may be defined between vertical lines 601 and 603, where vertical lines represent a maximum and minimum valid $P_{SS}$, respectively. Vertical line 601 is shown as a constant $P_{SS}$ line, intersecting with the maximum $P_{SS}$ value of shaded region 606. Vertical line 603 is shown as a constant $P_{SS}$ line, intersecting with the minimum $P_{SS}$ value of shaded region 606. This valid operating region of $P_{SS}$ may be calculated by a preprocessing module and provided to the high level optimizer 312 as simple upper and lower bounds on $P_{SS}$.

FIG. 7b shows a representation of the capacity constraint and the power factor constraint, assuming that the $P_{SS}$ value of the power factor constraint integrates to zero over the time horizon. As shown in FIG. 7b, shaded region 602 is defined by the capacity constraint and is the same as shown in FIG. 7a. However, shaded region 608 represents the operating region necessary to meet the target power factor, assuming that the $P_{SS}$ term integrates to zero over the time horizon.

According to some embodiments, the target power factor constraints may be integrated into the cost function. The target power factor constraints may be implemented into the cost function by adding a power factor constraint violation amount in the cost function. A modified cost function, taking into account the power factor may be defined as:

$$J = \sum_{k \in horizon} r_k P_{EG,k} + p_k v_k + w r_{demand,k} P_{max}$$

In the modified cost function, shown above, the power factor constraint violation amount has been added as term $v_k$. The variable $p_k$ represents a penalty cost. The additional constraints must also be added to the modified cost function:

$$P_{SS} < P_{SS,max} + v_k$$

$$P_{SS} > P_{SS,min} - v_k$$

The penalty cost, $p_k$, may be varied over the course of the month. If the power factor is less than the target power factor, the constraint may be tightened by increasing the penalty cost, $p_k$, whereas if the power factor is greater than the target power factor, the constraint may be loosened by decreasing the penalty cost, $p_k$.

In some embodiments, any or all of the constraints and/or cost functions described above may be used in an asset allocator as described with reference to U.S. patent application Ser. No. 15/473,496, titled "Central Plant with Asset Allocator" and filed Mar. 29, 2017, the entirety of which is incorporated by reference herein.

Planning Tool

Figure 8:
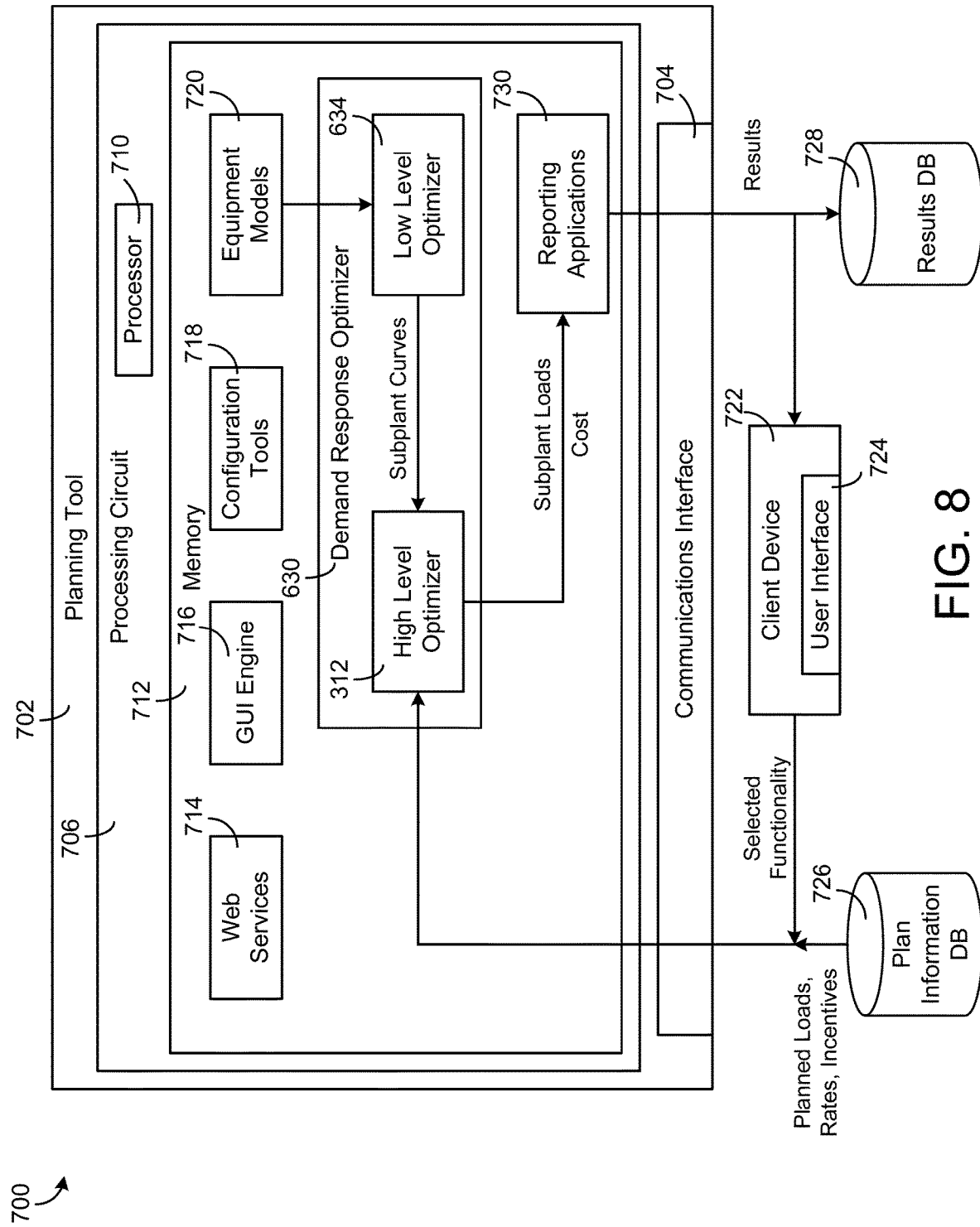
FIG. 8 is a block diagram of a planning tool, shown to include the high level optimizer of FIG. 5, according to some embodiments.

Referring now to FIG. 8, a block diagram of a planning system 700 is shown, according to an exemplary embodiment. Planning system 700 may be configured to use a demand response optimizer 630 as part of a planning tool 702 to simulate the operation of an energy storage system (e.g., system 200) over a predetermined time period (e.g., a day, a month, a week, a year, etc.) for planning, budgeting, and/or design considerations. When implemented in planning tool 702, demand response optimizer 630 may operate by using any of the techniques described in U.S. patent application Ser. No. 15/474,511, titled "Building Energy Storage System with Planning Tool" and filed Mar. 6, 2017, the entirety of which is incorporated by reference herein. For example, demand response optimizer 630 may use building loads and utility rates to determine an optimal resource allocation to minimize cost over a planning period. However, planning tool 702 may not be responsible for real-time control of a building management system or energy storage system.

Planning tool 702 can be configured to determine the benefits of investing in a battery asset and the financial metrics associated with the investment. Such financial metrics can include, for example, the internal rate of return (IRR), net present value (NPV), and/or simple payback period (SPP). Planning tool 702 can also assist a user in determining the size of the battery which yields optimal financial metrics such as maximum NPV or a minimum SPP. In some embodiments, planning tool 702 allows a user to specify a battery size and automatically determines the benefits of the battery asset from participating in selected IBDR programs while performing PBDR, as described with reference to FIG. 5 of U.S. patent application Ser. No. 15/474,511. In some embodiments, planning tool 702 is configured to determine the battery size that minimizes SPP given the IBDR programs selected and the requirement of performing PBDR. In some embodiments, planning tool 702 is configured to determine the battery size that maximizes NPV given the IBDR programs selected and the requirement of performing PBDR.

In any of the aforementioned cases, planning tool 702 may allow the user to select one or more which IBDR programs in which to participate. The IBDR program options available may include frequency regulation (FR) and economic load demand response (ELDR), among others. Additionally, the user may be given the option of modifying and entering several inputs pertinent to each program, which will be explained in greater detail below. Planning tool 702 may calculate the savings from PBDR and the revenue generated corresponding to the selected IBDR programs, in addition to the pro forma (financial statement) of the investment up to 20 years. The pro forma may include total annual benefit, battery performance parameters (e.g., cost of annual energy capacity augmentation), cash flow, accumulated cash balance, NPV, IRR, and SPP. Examples of how these financial metrics are calculated are provided below.

In planning tool 702, high level optimizer 312 may receive planned loads and utility rates for the entire planning period. The planned loads and utility rates may be defined by input received from a user via a client device 722 (e.g., user-defined, user selected, etc.) and/or retrieved from a plan information database 726. High level optimizer 312 uses the planned loads and utility rates in conjunction with subplant curves from low level optimizer 634 to determine an optimal resource allocation (i.e., an optimal dispatch schedule) for a portion of the planning period.

The portion of the planning period over which high level optimizer 312 optimizes the resource allocation (i.e., the optimization period) may be defined by a prediction window ending at a time horizon. With each iteration of the optimization, the prediction window is shifted forward and the portion of the dispatch schedule no longer in the prediction window is accepted (e.g., stored or output as results of the simulation). Load and rate predictions may be predefined for the entire simulation and may not be subject to adjustments in each iteration. However, shifting the prediction window forward in time may introduce additional plan information (e.g., planned loads and/or utility rates) for the newly-added time slice at the end of the prediction window. The new plan information may not have a significant effect on the optimal dispatch schedule since only a small portion of the prediction window changes with each iteration.

In some embodiments, high level optimizer 312 requests all of the subplant curves used in the simulation from low level optimizer 634 at the beginning of the simulation. Since the planned loads and environmental conditions are known for the entire planning period, high level optimizer 312 may retrieve all of the relevant subplant curves at the beginning of the simulation. In some embodiments, low level optimizer 634 generates functions that map subplant production to equipment level production and resource use when the subplant curves are provided to high level optimizer 312. These subplant to equipment functions may be used to calculate the individual equipment production and resource use (e.g., in a post-processing module) based on the results of the simulation.

Still referring to FIG. 8, planning tool 702 is shown to include a communications interface 704 and a processing circuit 706. Communications interface 704 may include wired or wireless interfaces (e.g., jacks, antennas, transmitters, receivers, transceivers, wire terminals, etc.) for conducting data communications with various systems, devices, or networks. For example, communications interface 704 may include an Ethernet card and port for sending and receiving data via an Ethernet-based communications network and/or a Wi-Fi transceiver for communicating via a wireless communications network. Communications interface 704 may be configured to communicate via local area networks or wide area networks (e.g., the Internet, a building WAN, etc.) and may use a variety of communications protocols (e.g., BACnet, IP, LON, etc.).

Communications interface 704 may be a network interface configured to facilitate electronic data communications between planning tool 702 and various external systems or devices (e.g., client device 722, results database 728, plan information database 726, etc.). For example, planning tool 702 may receive planned loads and utility rates from client device 722 and/or plan information database 726 via communications interface 704. Planning tool 702 may use communications interface 704 to output results of the simulation to client device 722 and/or to store the results in results database 728.

Still referring to FIG. 8, processing circuit 706 is shown to include a processor 710 and memory 712. Processor 710 may be a general purpose or specific purpose processor, an application specific integrated circuit (ASIC), one or more field programmable gate arrays (FPGAs), a group of processing components, or other suitable processing components. Processor 710 may be configured to execute computer code or instructions stored in memory 712 or received from other computer readable media (e.g., CDROM, network storage, a remote server, etc.).

Memory 712 may include one or more devices (e.g., memory units, memory devices, storage devices, etc.) for storing data and/or computer code for completing and/or facilitating the various processes described in the present disclosure. Memory 712 may include random access memory (RAM), read-only memory (ROM), hard drive storage, temporary storage, non-volatile memory, flash memory, optical memory, or any other suitable memory for storing software objects and/or computer instructions. Memory 712 may include database components, object code components, script components, or any other type of information structure for supporting the various activities and information structures described in the present disclosure. Memory 712 may be communicably connected to processor 710 via processing circuit 706 and may include computer code for executing (e.g., by processor 710) one or more processes described herein.

Still referring to FIG. 8, memory 712 is shown to include a GUI engine 716, web services 714, and configuration tools 718. In an exemplary embodiment, GUI engine 716 includes a graphical user interface component configured to provide graphical user interfaces to a user for selecting or defining plan information for the simulation (e.g., planned loads, utility rates, incentive rates, locational marginal prices, photovoltaic generation, environmental conditions, etc.). Web services 714 may allow a user to interact with planning tool 702 via a web portal and/or from a remote system or device (e.g., an enterprise control application).

Configuration tools 718 can allow a user to define (e.g., via graphical user interfaces, via prompt-driven "wizards," etc.) various parameters of the simulation. For example, the user can specify a size or capacity for each asset or subplant of the energy storage system, the number and type of subplants, the devices within each subplant, the subplant curves, device-specific efficiency curves, the duration of the simulation, the duration of the prediction window, the duration of each time step, and/or various other types of plan information related to the simulation. Configuration tools 718 can present user interfaces for building the simulation. The user interfaces may allow users to define simulation parameters graphically. In some embodiments, the user interfaces allow a user to select a pre-stored or pre-constructed simulated plant and/or plan information (e.g., from plan information database 726) and adapt it or enable it for use in the simulation.

In some embodiments, configuration tools 718 prompt the user to select one or more optional functions that can be used during the simulation. For example, the user can select one or more IBDR programs in which to participate (e.g., FR, ELDR, etc.). Configuration tools 718 may prompt the user to select one or more financial metrics to optimize (e.g., IRR, NPV, SPP, etc.). In some embodiments, configuration tools 718 generate various input sheets which allow the user to enter plan data for use during the simulation (e.g., utility rates, demand charges, peak load contribution charges, electric load, photovoltaic generation rates, locational marginal prices, FR incentives, etc.). The user can specify plan data for each hour of the planning period and enter such data into the input sheets.

Still referring to FIG. 8, memory 712 is shown to include demand response optimizer 630. Demand response optimizer 630 may use the planned loads and utility rates to determine an optimal resource allocation over a prediction window. With each iteration of the optimization process, demand response optimizer 630 may shift the prediction window forward and apply the optimal resource allocation for the portion of the planning period no longer in the prediction window. Demand response optimizer 630 may use the new plan information at the end of the prediction window to perform the next iteration of the optimization process. Demand response optimizer 630 may output the applied resource allocation to reporting applications 730 for presentation to a client device 722 (e.g., via user interface 724) or storage in results database 728. In some embodiments, demand response optimizer 630 stores the results of the optimization in output sheets, which can be presented to the user via user interface 724.

Still referring to FIG. 8, memory 712 is shown to include reporting applications 730. Reporting applications 730 may receive the optimized resource allocations from demand response optimizer 630 and, in some embodiments, costs associated with the optimized resource allocations. Reporting applications 730 may include a web-based reporting application with several graphical user interface (GUI) elements (e.g., widgets, dashboard controls, windows, etc.) for displaying key performance indicators (KPI) or other information to users of a GUI. In addition, the GUI elements may summarize relative energy use and intensity across various plants, subplants, or the like. Other GUI elements or reports may be generated and shown based on available data that allow users to assess the results of the simulation. The user interface or report (or underlying data engine) may be configured to aggregate and categorize resource allocation and the costs associated therewith and provide the results to a user via a GUI. The GUI elements may include charts or histograms that allow the user to visually analyze the results of the simulation.

Expected Behavior

Figure 9:
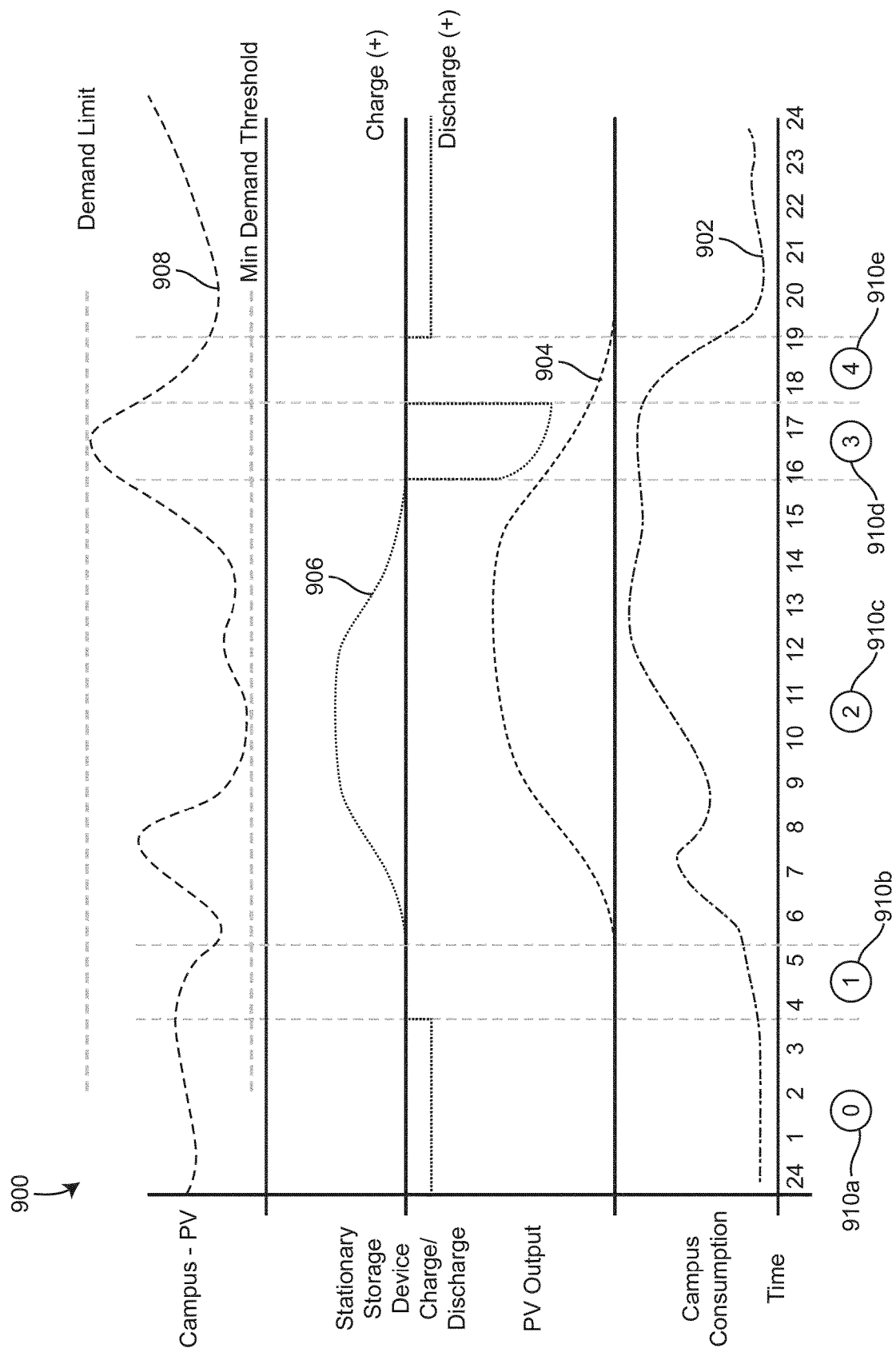
FIG. 9 is a graph of an expected operation of the electrical energy storage system of FIGS. 2-3, according to some embodiments.

Referring now to FIG. 9, a graph 900 of an expected behavior of system 200 is shown, according to some embodiments. Graph 900 is shown to include plots of campus consumption 902, PV output 904, stationary storage device charge/discharge 906, and campus-PV 908 versus time for a day. Campus-PV plot 908 may represent the amount of power which the campus must draw from the energy grid (i.e., power not supplied by stationary storage device or PV field). Time interval 910a is in the evening when the campus is at its minimum consumption. During time interval 910a, the stationary storage device is discharging energy stored from the PV field to prepare for the next day. The stationary storage device discharges to the point where it has just enough energy to meet any demand peaks that may occur before the PV field starts producing power (i.e., before sunrise). Time interval 910b is the early morning, where the stationary storage device has depleted its charge to the lowest point, but the PV field has not yet began producing power. During time interval 910b, the high level optimizer has determined that the campus will not hit demand peak for the remainder of the night, so the stationary storage device may not need to discharge. Time interval 910c shows when the PV field has begun producing power. During time interval 910c, the stationary storage device may attempt to fully charge. Time interval 910d is when the campus consumption is higher than the power produced by the PV field. The stationary storage device discharges enough power to ensure that the demand peak is not exceeded. Time interval 910e is when afternoon peak has passed and the stationary storage device may still have an opportunity to charge further from the PV field.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. An energy storage system comprising:
   a photovoltaic energy field configured to convert solar energy into electrical energy;
   a stationary energy storage device;
   an energy converter configured to convert the electrical energy from the photovoltaic energy field and store the converted energy in the stationary energy storage device at a charge rate, convert the electrical energy stored in the stationary energy storage device into AC power and discharge the AC power a discharge rate, and supply a campus with the AC power at the discharge rate;
   a point of interconnection configured to receive power from an energy grid, the energy converter, and the photovoltaic energy field and configured to supply power to the campus; and
   a controller configured to:
      predict a load of the campus over a time horizon;
      predict an energy generation of the photovoltaic energy field over the time horizon;
      generate a cost function defining a cost of supplying the power to the campus over the time horizon;

identify a current reactive power of the campus;
determine a required amount of reactive power from the energy converter to at least partially negate the current reactive power to achieve a target power factor;
apply a set of constraints to the cost function, the constraints defining a relationship between the discharge rate of the AC power and one or more variables in the cost function and ensuring that the energy converter has sufficient capacity to supply both the AC power at the discharge rate and the required amount of reactive power;
determine a solution to the cost function which satisfies the set of constraints, wherein the solution comprises a minimization of the cost function over the time horizon, a specific discharge rate of the AC power, and at least one of the required amount of reactive power or the target power factor to achieve the solution; and
control the energy converter to supply the campus with the AC power at the specific discharge rate and the required amount of reactive power to achieve the target power factor.

2. The energy storage system of claim 1, wherein the cost function comprises:
an energy charge defining a cost per unit of energy received from the energy grid; and
a demand charge defining a cost based on a maximum rate of energy usage over a demand charge horizon.

3. The energy storage system of claim 2, wherein the cost function comprises a weighting term that normalizes the demand charge horizon to the time horizon.

4. The energy storage system of claim 1, wherein the set of constraints comprise at least one of:
an energy balance constraint ensuring that the solution satisfies an energy balance of the energy storage system at the point of interconnection;
a set of stationary storage system constraints ensuring that the solution satisfies an energy capacity of the stationary energy storage device and that the solution does not require the stationary energy storage device to provide AC power to the campus at a discharge rate greater than a threshold value;
a minimum import constraint ensuring that power is not returned to the energy grid;
a maximum import constraint ensuring that the power drawn from the energy grid does not exceed a demand value; or
a power factor constraint ensuring at least one of:
the solution results in a power factor of the campus meeting a power factor target at all time intervals in the time horizon; or
the solution results in an average power factor of the campus meeting an average power factor target over a period of time.

5. The energy storage system of claim 1, further comprising:
a campus predictor configured to predict an energy load of the campus; and
a photovoltaic predictor configured to predict a rate of energy production by the photovoltaic energy field.

6. The energy storage system of claim 5, wherein the campus predictor is configured to predict the energy load of the campus based on historical load data of the campus and weather data, and wherein the photovoltaic predictor is configured to predict the rate of energy production by the photovoltaic energy field based on historical energy production data of the photovoltaic energy field and weather data.

7. The energy storage system of claim 1, wherein determining the required amount of reactive power comprises measuring a real power of the photovoltaic field, a real power of the campus, a reactive power of the campus, and a real power of the energy converter and calculating the required amount of reactive power based on at least one of the real power of the photovoltaic field, the real power of the campus, the reactive power of the campus, and the real power of the energy converter.

8. A method for decreasing a cost associated with powering a campus, the method comprising:
converting solar energy into electrical energy and storing the electrical energy in a stationary energy storage device at a charge rate;
converting the electrical energy stored in the stationary energy storage device into AC power at a discharge rate and supplying the AC power at the discharge rate to the campus;
generating a cost function defining a cost of supplying the power to the campus over the time horizon;
identifying a current reactive power of the campus;
determining a required amount of reactive power from the energy converter to at least partially negate the current reactive power to achieve a target power factor;
applying a set of constraints to the cost function, the constraints defining a relationship between the discharge rate of the AC power and one or more variables in the cost function and ensuring that the energy converter has sufficient capacity to supply both the AC power at the discharge rate and the required amount of reactive power;
determining a solution to the cost function which satisfies the set of constraints, wherein the solution comprises a minimization of the cost function over the time horizon, a specific discharge rate of the AC power, and at least one of the required amount of reactive power or the target power factor to achieve the solution; and
controlling the energy converter to supply the campus with the AC power at the specific discharge rate and the required amount of reactive power to achieve the target power factor.

9. The method of claim 8, wherein the cost function comprises:
an energy charge defining a cost per unit of energy received from the energy grid; and
a demand charge defining a cost based on a maximum rate of energy usage over a demand charge horizon.

10. The method of claim 9, wherein the cost function comprises a weighting term that normalizes the demand charge horizon to the time horizon.

11. The method of claim 10, the method further comprising:
applying an energy balance constraint to the cost function that ensures that the solution satisfies an energy balance of an energy storage system at a point of interconnection;
applying a set of stationary storage system constraints to the cost function that ensures that the solution satisfies an energy capacity of the stationary energy storage device and that the solution does not require the stationary energy storage device to provide AC power to the campus at a discharge rate greater than a threshold value;

applying a minimum import constraint to the cost function that ensures that power is not returned to the energy grid;

applying a maximum import constraint to the cost function that ensures that the power drawn from the energy grid does not exceed a demand value;

applying a power factor constraint ensuring at least one of:

the solution results in a power factor of the campus meeting a power factor target at all time intervals in the time horizon; or the solution results in an average power factor of the campus meeting an average power factor target over a period of time.

12. A controller for an energy storage system having a photovoltaic energy field, a battery, and a battery inverter configured to charge the battery with electrical energy from the photovoltaic energy field, convert stored electrical energy from the battery into AC power, and discharge the AC power at a discharge rate to supply power to a campus, the controller configured to:

predict a load of the campus over a time horizon;

predict an energy generation of the photovoltaic energy field over the time horizon;

generate a cost function defining a cost of supplying the power to the campus over the time horizon;

identify a current reactive power of the campus;

determine a required amount of reactive power from the battery inverter to at least partially negate the current reactive power to achieve a target power factor;

apply a set of constraints to the cost function, the constraints defining a relationship between the discharge rate of the AC power and one or more variables in the cost function and ensuring that the battery inverter has sufficient capacity to supply both the AC power at the discharge rate and the required amount of reactive power;

determine a solution to the cost function which satisfies the set of constraints, wherein the solution comprises a minimization of the cost function over the time horizon, a specific discharge rate of the AC power, and at least one of the required amount of reactive power or the target power factor to achieve the solution; and control the battery inverter to supply the campus with the AC power at the specific discharge rate and the required amount of reactive power to achieve the target power factor.

13. The controller of claim 12, wherein the cost function comprises:

an energy charge defining a cost per unit of energy received from the energy grid; and a demand charge defining a cost based on a maximum rate of energy usage over a demand charge horizon.

14. The controller of claim 13, wherein the cost function comprises a weighting term that normalizes the demand charge horizon to the time horizon.

15. The controller of claim 14, wherein the set of constraints comprise at least one of:

an energy balance constraint ensuring that the solution satisfies an energy balance of the energy storage system at the point of interconnection;

a set of battery capacity constraints ensuring that the solution satisfies an energy capacity of the battery and that the solution does not require the battery to provide AC power to the campus at a discharge rate greater than a threshold value;

a minimum import constraint ensuring that power is not returned to the energy grid;

a maximum import constraint ensuring that the power drawn from the energy grid does not exceed a demand value; and a power factor constraint ensuring at least one of:

the solution results in a power factor of the campus meeting a power factor target at all time intervals in the time horizon; or the solution results in an average power factor of the campus meeting an average power factor target over a period of time.

16. The controller of claim 15, further comprising:

a campus predictor configured to predict an energy load of the campus over the time horizon; and a photovoltaic predictor module configured to predict a rate of energy production by the photovoltaic energy field over the time horizon.

17. The controller of claim 16, wherein the campus load predictor is further configured to calculate an uncertainty of the predicted energy load of the campus over the time horizon and the photovoltaic predictor is further configured to calculate an uncertainty of the predicted rate of photovoltaic energy production over the time horizon.

18. The controller of claim 16, further comprising a low level controller configured to determine control signals to adjust an operation of the battery inverter to achieve the specific discharge rate and power factor of the battery inverter.

19. The controller of claim 15, wherein the cost function further comprises a power factor term defining a power factor violation term and a penalty cost associated with the power factor violation term.

20. The controller of claim 19, wherein the controller is configured to increase or decrease the power factor violation term based on at least one of a difference of the power factor of the campus and the power factor target and a difference of the average power factor of the campus and the target average power factor over a period of time.

* * * * *